US011228560B2

(12) United States Patent
Das et al.

(10) Patent No.: US 11,228,560 B2
(45) Date of Patent: Jan. 18, 2022

(54) MOBILITY FUNCTIONALITY FOR A CLOUD-BASED ACCESS SYSTEM

(71) Applicant: Federated Wireless, Inc., Arlington, VA (US)

(72) Inventors: Deepak Das, Lexington, MA (US); Arijit Banerjee, Melrose, MA (US); Sarath Padakandla, Herndon, VA (US); Saurabh Gupta, Westford, MA (US)

(73) Assignee: FEDERATED WIRELESS, INC., Arlington, VA (US)

( * ) Notice: Subject to any disclaimer, the term of this patent is extended or adjusted under 35 U.S.C. 154(b) by 38 days.

(21) Appl. No.: 15/972,047

(22) Filed: May 4, 2018

(65) Prior Publication Data

US 2018/0324138 A1 Nov. 8, 2018

Related U.S. Application Data

(60) Provisional application No. 62/501,513, filed on May 4, 2017.

(51) Int. Cl.
  *H04L 29/12* (2006.01)
  *H04W 36/00* (2009.01)
  *H04W 80/04* (2009.01)

(52) U.S. Cl.
  CPC ...... *H04L 61/2015* (2013.01); *H04L 61/2053* (2013.01); *H04W 36/0033* (2013.01); *H04W 36/0055* (2013.01); *H04W 80/04* (2013.01)

(58) Field of Classification Search
  None
  See application file for complete search history.

(56) References Cited

U.S. PATENT DOCUMENTS

| 9,338,710 | B2 | 5/2016 | Johansson et al. |
| 2006/0268834 | A1* | 11/2006 | Bajic ............ H04L 63/101 370/352 |
| 2009/0064207 | A1* | 3/2009 | Sigal ............... G06F 9/544 719/330 |
| 2011/0051683 | A1* | 3/2011 | Ramankutty ..... H04W 36/0033 370/331 |

(Continued)

FOREIGN PATENT DOCUMENTS

| EP | 2661122 A2 | 11/2013 |
| WO | 2014183107 A3 | 3/2015 |

OTHER PUBLICATIONS

International Search Report and Written Opinion issued in application No. PCT/US2018/031252 dated Oct. 16, 2018.

(Continued)

*Primary Examiner* — Kodzovi Acolatse
*Assistant Examiner* — The Hy Nguyen
(74) *Attorney, Agent, or Firm* — Finnegan, Henderson, Farabow, Garrett & Dunner, LLP

(57) ABSTRACT

Embodiments provide an access point (AP) that includes a set of one or more base-station functions configured to connect a user equipment (UE) to the AP over a wireless communication interface; and a set of one or more core-network functions configured to provide services to the UE. The AP allocates an Internet Protocol (IP) address to the UE by using at least one Dynamic Host Configuration Protocol (DHCP) server that is external to the AP.

16 Claims, 20 Drawing Sheets

(56) References Cited

U.S. PATENT DOCUMENTS

| | | | | |
|---|---|---|---|---|
| 2012/0196600 | A1* | 8/2012 | Mizukoshi | H04L 61/20 455/435.1 |
| 2013/0013926 | A1* | 1/2013 | Hakola | H04W 12/04 713/171 |
| 2013/0201979 | A1* | 8/2013 | Iyer | H04W 84/12 370/338 |
| 2013/0332399 | A1* | 12/2013 | Reddy | H04L 41/147 706/12 |
| 2014/0141743 | A1* | 5/2014 | Shaw | H04W 12/069 455/405 |
| 2014/0259012 | A1 | 9/2014 | Nandlall et al. | |
| 2014/0362790 | A1* | 12/2014 | McCann | H04W 40/248 370/329 |
| 2015/0334696 | A1* | 11/2015 | Gu | H04L 67/1095 718/1 |
| 2016/0330749 | A1 | 11/2016 | Mehrabanzad et al. | |
| 2017/0034749 | A1* | 2/2017 | Chandramouli | H04L 12/4633 |
| 2017/0164286 | A1* | 6/2017 | Jeong | H04W 52/0258 |
| 2019/0053044 | A1* | 2/2019 | Cho | H04W 76/11 |
| 2019/0058767 | A1* | 2/2019 | Chandramouli | G06F 9/4856 |

OTHER PUBLICATIONS

Extended European Search report issued in corresponding European Application No. 18794578.7, dated Dec. 17, 2020 (8 pages).

Droms Bucknell University R: "Dynamic Host Configuration Protocol; rfc2131.txt", Dynamic Host Configuration Protocol; RFC2131. TXT, Internet Engineering Task Force, IETF; Standard, Internet Society (ISOC) 4, Rue Des Falaises CH-1205 Geneva, Switzerland, Mar. 1, 1997 (Mar. 1, 1997), XP015007915,* sections 3.1, 3.2, 4.3, 4.4 *.

Nguyen Van-Giang et al: "SDN and Virtualization-Based LTE Mobile Network Architectures: A Comprehensive Survey", Wireless Personal Communications, Springer, Dordrecht, NL, vol. 86, No. 3, Aug. 6, 2015 (Aug. 6, 2015), pp. 1401-1438, XP035935761, ISSN: 0929-6212, DOI: 10.1007/S11277-015-2997-7 [retrieved on Aug. 6, 2015] * sections (including sub-sections): 3 and 5 *.

Toktam Mahmoodi et al: "On Using a SDN-based LTE Backhaul Control Plane", Jun. 17, 2013 (Jun. 17, 2013), XP055756918, Retrieved from the Internet: URL:https://nms.kol.ac.uk/toktam.mahmoodi/files/ewsdn13.pdf [retrieved on Dec. 4, 2020] * the whole document*.

* cited by examiner

MOBILITY FUNCTIONALITY FOR A CLOUD-BASED ACCESS SYSTEM

CROSS-REFERENCE TO RELATED APPLICATIONS

This application claims the benefits of U.S. Provisional Application Ser. No. 62/501,513, filed May 4, 2017, which is hereby incorporated by reference in its entirety.

FIELD OF INVENTION

The present invention relates to a wireless access infrastructure and, more particularly, to mobility in a cloud-based wireless access solution that can be integrated with enterprise deployments.

BACKGROUND

A conventional wireless access infrastructure includes a radio access network and a core network typically owned, managed, and controlled by a single wireless service provider called the wireless carrier. The radio access network, such as the Evolved Universal Terrestrial Radio Access (E-UTRA) defined in 3GPP's Long Term Evolution (LTE) standard, contains the network and equipment for connecting user equipment (UE), such as mobile devices and computers having wireless connectivity, to the core network. The core network, such as the Evolved Packet Core (EPC) defined in the LTE standard, contains the network and equipment for providing mobile voice and data services within the carrier's service environment and to external networks, such as the Internet, and other carriers' networks.

The LTE standard, for example, defines specific network nodes and communication interfaces for implementing the E-UTRA and EPC. According to the standard, the E-UTRAN includes one or more eNodeB's (base stations) configured to communicate with UEs and the EPC core network. The EPC includes at least a Mobility Management Entity (MME), which manages session states, authentication, paging, and mobility and roaming functions; a packet-data gateway (PGW), which sends/receives data packets to/from an external data network, such as the Internet; a Serving Gateway (SG-W), which routes data packets between the PGW and an eNodeB; and a Policy and Charging Rules Function (PCRF), which manages users, applications, and network resources based on carrier-configured rules.

FIG. 1 is a schematic block diagram of an exemplary LTE wireless access infrastructure 1000 including an E-UTRAN 1100 and an EPC 1200. The E-UTRAN 1100 includes at least one eNodeB 1102 configured to communicate with UEs 1002A and 1002B over wireless links. The EPC 1200 contains network nodes including an MME 1202, an SG-W 1204, a PGW 1206, and a PCRF 1208. While the exemplary infrastructure 1000 is depicted with only one PGW 1206 connected to an external packet-data network, such as the Internet, the EPC 1200 alternatively may contain multiple PGWs, each connecting the EPC 1200 to a different packet data network. The MME 1202, SG-W 1204, PGW 1206, and PCRF 1208 are implemented in software on dedicated hardware (computers) 1302, 1304, 1306, and 1308. The dedicated hardware may be a single server or a cluster of servers. The LTE network nodes 1202, 1204, 1206, and 1208 are typically implemented as monolithic software modules that execute on their respective dedicated hardware 1302, 1304, 1306, and 1308.

The LTE standard not only defines functionalities in each of the MME 1202, SG-W 1204, PGW 1206, and PCRF 1208, but also defines the communication interfaces between them. The LTE standard defines several interfaces including, for example, an "S1-MME" interface between the eNodeB 1102 and the MME 1202, an "S1-U" interface between the eNodeB 1102 and the SG-W 1204, an "S11" interface between the MME 1202 and the SG-W 1204, an "S5" interface between the SG-W 1204 and the PGW 1206, and a "Gx" interface between the PCRF 1208 and the PGW 1206. The exemplary infrastructure 1100 illustrates these standardized interfaces.

Because the communication interfaces and network nodes in the LTE wireless access infrastructure 1000 are standardized, they ensure compatibility between the MME 1202, SG-W 1204, PGW 1206, and PCRF 1208, even when those nodes are programmed and/or developed by different manufacturers. Such standardization also ensures backward compatibility with legacy versions of any nodes that may have been previously deployed in the infrastructure 1000.

The need for multiple, dedicated network nodes makes deployment of an LTE wireless access infrastructure, such as the exemplary infrastructure 1000, costly and complex. Specifically, IP-centric enterprise solutions with typical web-based interfaces and protocols do not generally work seamlessly with the 3GPP-based standardized functions and interfaces. For example, the interfaces of a typical Cloud-based service in the enterprise based on HTTPS (Hyperlink Text Transfer Protocol) are not easy to connect to 3GPP nodes with standardized interfaces such as S1 over SCTP. The standardized nodes and interfaces in conventional wireless access infrastructures also make scaling the infrastructure challenging. For example, it may be difficult to deploy only a subset of the functions and/or communication interfaces defined by the standard. Furthermore, conventional wireless access infrastructures may not utilize resources efficiently within the infrastructure. In some conventional wireless access solutions, for example, a UE may be denied voice and/or data services because one of the network nodes is unable to handle an additional user even though other nodes are not being fully utilized. In other words, the capacity of the conventional infrastructure may be limited by the capacity of each node.

U.S. patent application Ser. No. 15/150,374, which is incorporated herein by reference in its entirety, discloses a cloud-based wireless access system using services. The cloud-based wireless access system may be configured to provide one or more functions of a conventional wireless access infrastructure, such as an E-UTRA radio access network and/or EPC core network defined in the LTE standard. The functions provided by the services may include, for example, an authentication function, a policy function, and a location function, among others, which would have been implemented in prior wireless access infrastructures by executing monolithic applications on dedicated hardware (e.g., MME, SG-W, PGW, and PCRF) via standardized interfaces (e.g., S11 and S1-MME). Each service may include both a cloud portion and a distributed portion, whereby the cloud portion may communicate with its corresponding distributed portion using known cloud interfaces and protocols, such as HTTPS/TLS. As a result, the cloud-based wireless access system may use less hardware and fewer interfaces, and is more configurable than prior wireless access infrastructures.

In the cloud-based wireless access system, each service may provide radio access network and/or core network functions in addition to functions related to one or more enterprise applications. An enterprise application in this context provides one or more services within an enterprise network, such as a network in a corporate, governmental, academic, non-profit, or other organization or entity. Advantageously, for example, an authentication service may provide the authentication functions of a standards-based 3GPP-LTE ATTACH process and, in addition, may provide separate enterprise-specific authentication functions, such as Single-Sign-On and/or LDAP authentication in an integrated way. The cloud-based wireless access infrastructure provides a platform in which services may be used to efficiently integrate standardized wireless network functions and services with enterprise functions and services not defined in the standard.

An access point (AP) may be used to provide wireless network access to one or more UEs in an enterprise network in the cloud-based wireless access system. To that end, the AP may provide a set of one or more eNodeB functions and a set of one or more EPC functions for each UE in communication with the AP. Accordingly, the access point may act as a "Network in a Box" (NIB). The one or more eNodeB functions may be configured to receive information from the UE and pass that information to the one or more EPC functions allocated for the UE. The AP may include a distributed portion of a service, such as an authentication service, configured to receive the information from the one or more EPC functions and communicate the information to a corresponding cloud portion of the service running on a cloud platform. The cloud portion of the service on the cloud platform may return a response, such as an authentication result, to its distributed portion on the AP, for example, based on the result of performing an enterprise authentication process and a carrier authentication process. In the case of an authentication service, for example, the cloud portion of the service may forward the authentication result to the one or more EPC functions for further processing. Additionally, the cloud portion of the service may cause a network device (such as a network router or switch) to be configured in a software-defined networking architecture, based on the authentication result.

SUMMARY

One embodiment is an access point (AP), comprising: a set of one or more base-station functions configured to connect a user equipment (UE) to the AP over a wireless communication interface; and a set of one or more core-network functions configured to provide services to the UE, wherein the AP allocates an Internet Protocol (IP) address to the UE by using at least one Dynamic Host Configuration Protocol (DHCP) server that is external to the AP.

In one embodiment, the IP address allocated to the UE does not change when the UE is handed over to another AP with another set of one or more base-station functions and another set of one or more core-network functions.

In one embodiment, the AP further includes a layer 2 virtualized switch, wherein the set of one or more core-network functions communicate with the at least one DHCP server through the layer 2 virtualized switch for allocating the IP address to the UE.

In one embodiment, the AP communicates the IP address to a cloud service, wherein the cloud service stores the IP address in a database table comprising a set of identities (IDs) associated with the UE.

In one embodiment, the set of one or more base-station functions are one or more eNodeB functions, wherein the set of one or more core-network functions are one or more or all EPC functions.

In one embodiment, the set of one or more core-network functions include a mobility management function (MMF) and an optimized packet function (OPF), wherein the MMF is configured to perform at least a subset of functions of an MME, wherein the OPF is configured to perform at least a subset of functions of an SG-W node or a PGW node.

In one embodiment, the AP allocates the IP address to the UE as part of a UE attach process, wherein during the attach process, the MMF sends a UE information request to the cloud service with IMSI as a parameter and receives a UE MAC address in response, wherein the MMF sends the UE MAC address to the OPF.

In one embodiment, the AP further includes open vSwitch (OVS) function and an OVS, wherein the OPF sends the UE MAC to the OVS function, wherein the OVS function and the OVS create a virtual Ethernet (VETH) pair, wherein the OVS opens a layer 2 (L2) raw socket and binds the socket to a first VETH port from the pair, wherein the OVS functions adds the first VETH port to the OVS and sends a second VETH port from the pair to the OPF, wherein the OPF creates a UE entry in a UE table in its database, wherein the OPF opens an L2 raw socket and binds to the second VETH port using the L2 raw socket.

In one embodiment, the OPF triggers an IP address allocation procedure from the one or more DHCP servers for the UE.

In one embodiment, the IP address has a lease time, wherein the OPF starts three timers T1, T2, and T3 for the UE, wherein T3 is a time till lease expiry, T1 is a configurable time such that T1<T3, wherein T1 indicates when a lease renew from a corresponding DHCP server has to be attempted by unicasting, wherein T2 is a configurable time such that T1<T2<T3, wherein T2 indicates when a lease renew from any DHCP server has to be attempted by broadcasting.

In one embodiment, the OPF communicates with the one or more DHCP servers according to the three timers and through the OVS to renew or deallocate the lease that maintains the IP address for the UE.

In one embodiment, DHCP rules are retained at the OVS for subsequent DHCP IP address renewal.

A further embodiment is a first access point (AP), comprising: a set of one or more first base-station functions configured to connect a user equipment (UE) to the AP over a wireless communication interface; and a set of one or more first core-network functions configured to provide services to the UE, wherein the set of one or more first core-network functions include a first mobility management function (MMF) and a first optimized packet function (OPF), wherein the first MMF and the first OPF are configured to perform a handover of the UE to a second AP.

In one embodiment, the handover is an X2 handover.

In one embodiment, the first AP communicates an IP address of the UE to a cloud service, wherein the cloud service stores the IP address in a database table comprising a set of identities (IDs) associated with the UE, wherein the IP address of the UE does not change during the handover to the second AP.

In one embodiment, the set of one or more first base-station functions include a first eNodeB function, wherein the set of one or more second base-station functions include a second eNodeB function, wherein the first MMF and the second MMF are configured to perform at least a subset of functions of an MME, wherein the first OPF and the second OPF are configured to perform at least a subset of functions of an SG-W node or a PGW node.

In one embodiment, during the handover of the UE in the connected mode, the UE sends uplink data to the second eNodeB, wherein the second eNodeB sends the uplink data to the first OPF, wherein the first AP further includes a first OVS that communicates with the Internet through a backhaul network, wherein the handover includes identification of the first MMF to perform UE context transfer, wherein the second MMF look up an IP address of the first MMF IP using a GUMMEI as a key in the database table of the cloud service.

In one embodiment, the handover of the UE is performed in the idle mode, wherein when the first AP and the second AP have different tracking area IDs the handover is based on a GUMMEI of the first MMF in a TAU sent by the UE to the second AP, wherein when the first AP and the second AP have a same tracking area ID the handover is based on information from a centralized mobility manager that receives paging failures from the first AP.

A further embodiment is a first access point (AP), comprising: a set of one or more first base-station functions configured to connect a user equipment (UE) to the AP over a wireless communication interface; and a set of one or more first core-network functions configured to provide services to the UE, wherein the set of one or more first core-network functions include a first mobility management function (MMF) and a first optimized packet function (OPF), wherein the first MMF and the first OPF are configured to establish an X2 interface with a second AP by performing discovery using a cloud service, a DNS, or a static configuration.

A further embodiment is an access point (AP), comprising: a set of one or more base-station functions configured to connect a user equipment (UE) to the AP over a wireless communication interface; and a set of one or more core-network functions configured to provide services to the UE, wherein the set of one or more core-network functions are implemented in a control plane and a user plane and include a mobility management function (MMF) and an optimized packet function (OPF), wherein the control plane and the user plane perform at least one of a periodic TAU tracking or a paging or service request for the UE.

A further embodiment is a method for performing any functionality described herein with reference to one or more APs.

A further embodiment is a non-transitory computer-readable medium storing instruction that, when executed by a processor, cause the processor to perform any functionality described herein with reference to one or more APs.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION OF DISCLOSED EMBODIMENTS

Figure 1:
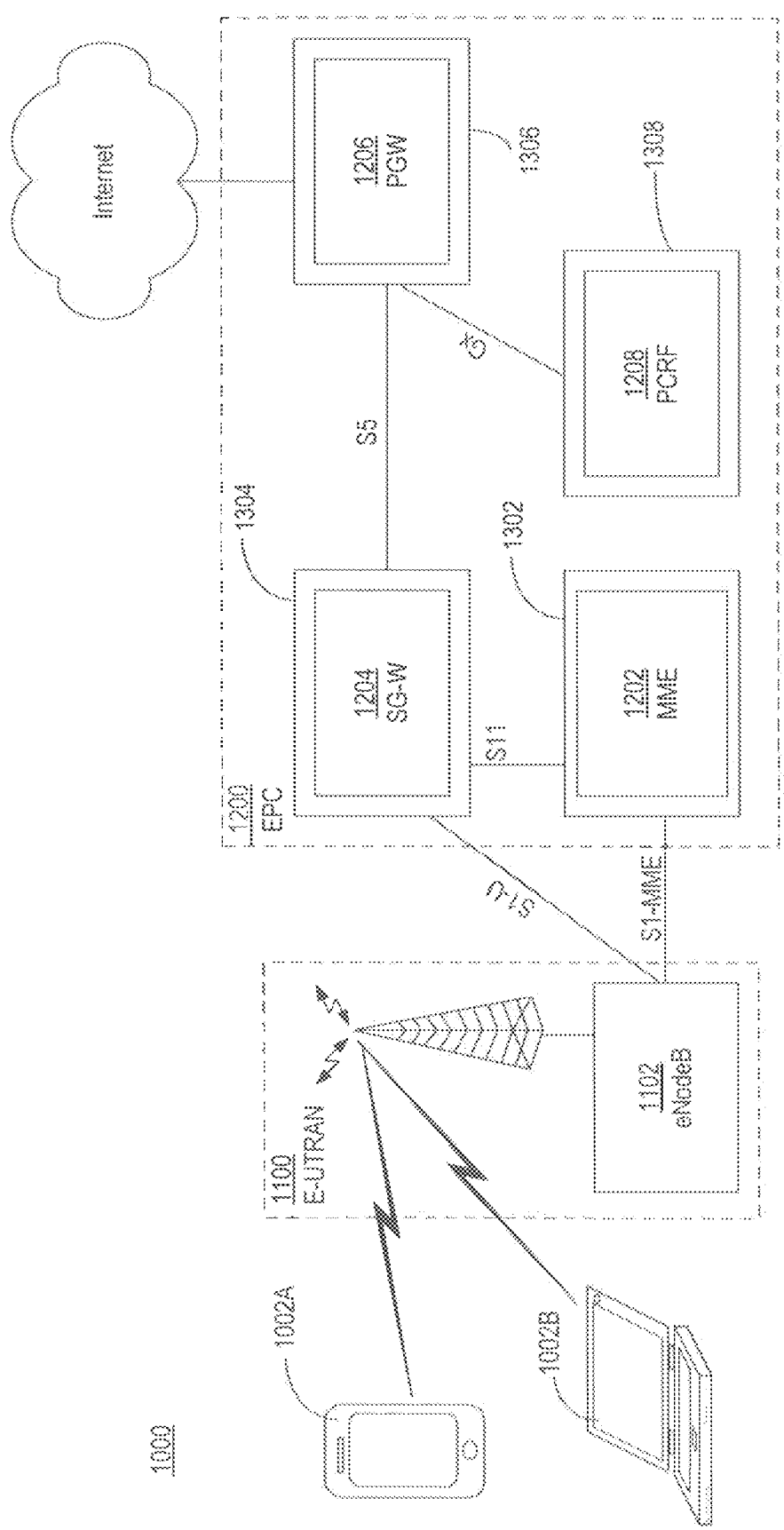
FIG. 1 is a schematic block diagram of an example conventional LTE wireless infrastructure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the nodes and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Figure 2:
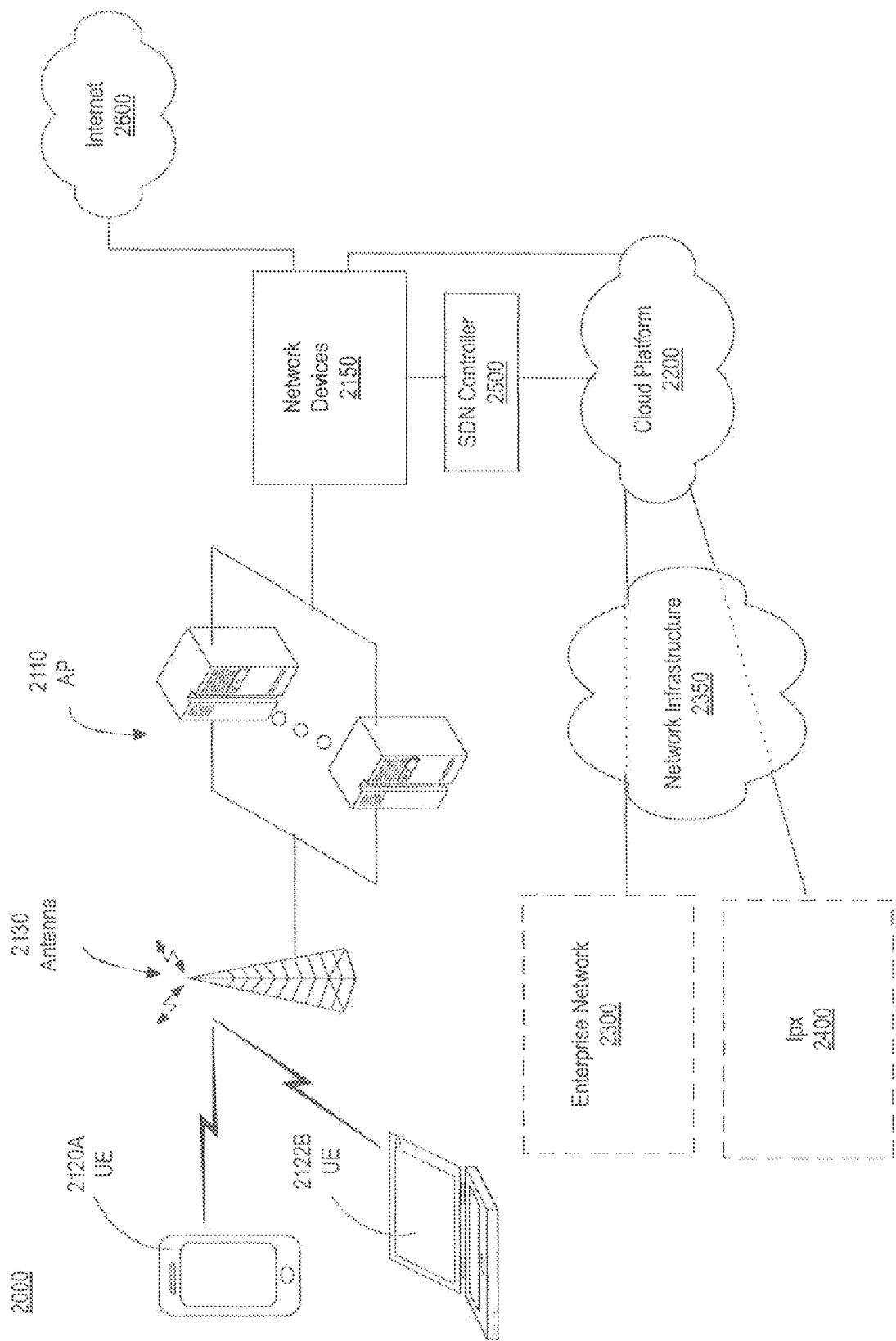
FIG. 2 illustrates a schematic block diagram of an exemplary cloud-based wireless access infrastructure in accordance with the disclosed embodiments.

FIG. 2 illustrates a block diagram of an exemplary cloud-based wireless access infrastructure 2000 in accordance with an embodiment. The exemplary cloud-based wireless access infrastructure 2000 may provide one or more access points (AP) 2110 through which users may communicate to access standardized wireless voice and/or data services, such as defined in the LTE standard, as well as enterprise-level applications and services that would be available to the user in an enterprise network of a corporate, governmental, academic, non-profit, or other organization or entity. For example, an organization may deploy an AP 2110 in a building to provide its employees in that building with wireless access to both LTE and enterprise-level services.

The exemplary cloud-based wireless access infrastructure 2000 includes at least first and second UEs 2120A-B, one or more antennas 2130, one or more APs 2110, one or more network devices 2150, a network controller 2500, a cloud platform 2200, an enterprise network 2300, and an internet protocol exchange (IPX) 2400. As shown in FIG. 2, each of the UEs 2120A-B may communicate with the AP 2110 through the antenna 2130 electrically coupled to the AP 2110. While a single antenna is shown in FIG. 2, the cloud-based wireless access infrastructure 2000 may alternatively employ multiple antennas, each electrically coupled to the AP 2110. In some embodiments, one or more antennas 2130 may connect to the AP 2110 and other antennas may connect to different APs in the same wireless access infrastructure. The AP 2110 may be implemented on one or more computer systems. The AP 2110, for example, may execute one or more software programs on a single computer or on a cluster of computers. Alternatively, the AP 2110 may be implemented as one or more software programs executing on one or more virtual computers.

The AP 2110 may be connected to one or more network devices 2150, which may be configured to forward data between the UEs 2120A-B (via the AP 2110) and external data networks, such as the Internet 2600 and/or the cloud platform 2200. The network devices 2150 may include, for example, a hub, a switch, a router, virtual switches/routers, a distributed virtual switch (vSwitch), a Dynamic Host Configuration Protocol (DHCP) server, an encrypted tunnel end-point manager, and/or any combination thereof. At least a subset of the network devices 2150 may be dynamically configured by a software-defined networking (SDN) controller. For example, as shown in FIG. 2, an SDN controller 2500 may configure one or more layer-two devices (e.g., switches) or layer-three devices (e.g., routers) in the set of network devices 2150, such that data packets or frames may be routed, processed, and/or blocked at the network devices based on various parameters, such as, but not limited to, the origin or destination of the data, type of data, and/or carrier or enterprise policies. Additionally, or alternatively, the SDN controller 2500 may configure at least a subset of the network devices 2150 to provide different qualities of service (QoS) to different UEs based on one or more policies associated with each UE. For example, the SDN controller 2500 may configure the one or more network devices 2150 to ensure that the UE 2120A, which may be associated with a business customer, receives a higher QoS compared with the UE 2120B, which may be associated with a non-business customer.

The SDN controller 2500 may configure one or more of the network devices 2150 based on data (including, for example, messages, notifications, instructions, measurements, authorizations, approvals, or other information) received from one or more services running in the cloud-based wireless access infrastructure 2000. For example, the SDN controller 2500 may receive instructions on how and which of the network devices 2150 to configure from a service on the cloud platform 2200. The cloud platform 2200 may communicate with the enterprise network 2300 and/or the IPX 2400. The cloud platform 2200 may include direct connections to the enterprise network 2300, as shown in FIG. 2. Alternatively, the cloud platform 2200 may employ indirect connections (not shown in the figures), such as using the Internet 2600 (via the network device 2150), to communicate with the enterprise network 2300. For example, the cloud platform 2200 may communicate with the enterprise network 2300 through the Internet 2600 using a tunneling protocol or technology, such as the IPSec protocol, or may communicate with an LTE EPC 1200 node of another carrier via the IPX 2400 using one or more standardized interfaces, such as the Gy, Gz, Gx, and S6a interfaces as defined in the LTE standard. In FIG. 2, the enterprise network 2300 is shown to be separate, but electrically coupled, with the cloud platform 2200. In other embodiments (not shown), however, the enterprise network 2300 may be implemented on the cloud platform 2200.

Figure 3:
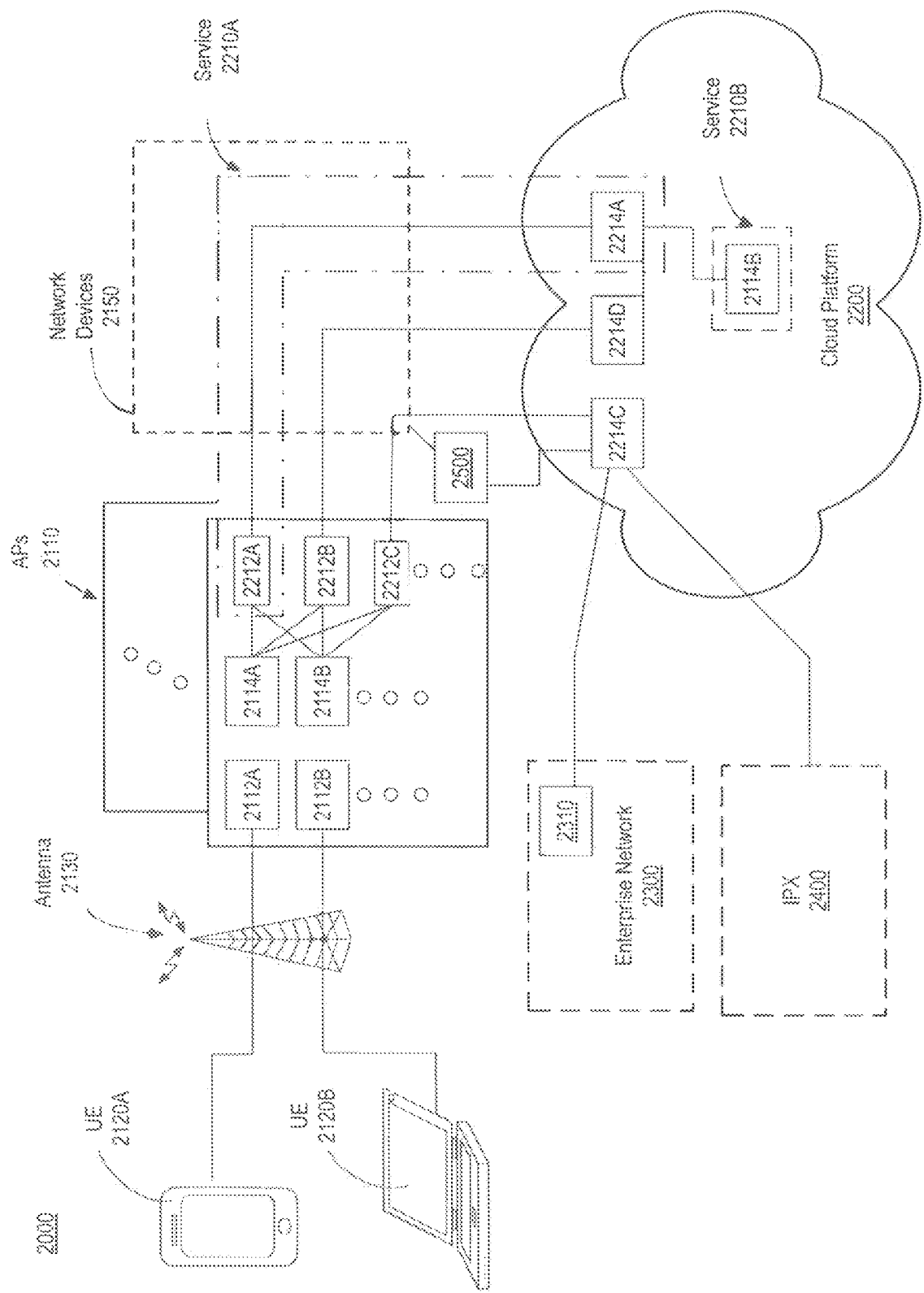
FIG. 3 illustrates a schematic block diagram of the exemplary cloud-based wireless access infrastructure of FIG. 2 showing additional implementation details in accordance with the disclosed embodiments.

FIG. 3 illustrates another illustrative block diagram of the exemplary cloud-based wireless access infrastructure 2000 of FIG. 2. FIG. 3 illustrates additional implementation details of the AP 2110, cloud platform 2200, and enterprise network 2300 that may be used in the exemplary cloud-based wireless access infrastructure 2000. As shown in FIG. 3, the AP 2110 may be configured to execute one or more instances of a software program configured to implement functions of a base station and one or more instances of a software program configured to implement functions of a core network. For example, in FIG. 3, eNodeB Functions 2112A-B represent at least two instances of a software program configured to provide at least a subset of functions of an LTE base station, such as the eNodeB 1102. Similarly, EPC Functions 2114A-B represent at least two instances of a software program configured to provide at least a subset of functions of an LTE core network, such as the EPC 1200. In some embodiments, the AP 2110 may be configured to execute one or more instances of a single software program configured to implement both the eNodeB Functions and EPC Functions.

In some embodiments, a fixed number of instances of eNodeB Function 2112A-B and a fixed number of instances of EPC Function 2114A-B may be instantiated and maintained in the AP 2110. The number of instances of the eNodeB Functions 2112A-B and the number of instances of the EPC Functions 2114A-B may be the same or different. When a UE 2120A wirelessly connects to the AP 2110, an existing instance of eNodeB Function 2112A and an existing instance of EPC Function 2114A may be assigned to handle communications with the UE 2120A. In other embodiments (e.g., when existing instances of eNodeB Function 2112A and EPC Function 2114A are unavailable to assign to the UE 2120A), the AP 2110 may instantiate a new instance of an eNodeB Function and a new instance of an EPC Function for the UE 2120A. In alternative embodiments, the AP 2110 may dynamically instantiate and assign a new instance of eNodeB Functions and a new instance of EPC Functions for each UE.

In some embodiments, an instance of the eNodeB Functions 2112A may be configured to provide all radio-related functions needed to send/receive data to/from a UE 2120A. For example, an instance of eNodeB Function 2112A may perform at least a subset of functions of an eNodeB as defined in the LTE standard including, but not limited to, functions of a physical (PHY) layer, media access control (MAC) layer, radio resource management (RRM), and/or self-organizing network (SON). Functions of a PHY layer (as defined in the LTE standard) may include, for example, channel coding, rate matching, scrambling, modulation mapping, layer mapping, pre-coding, resource mapping, orthogonal frequency-division multiplexing (ODFM), and/or cyclic redundancy checking (CRC). Functions of MAC layer (as defined in the LTE standard) may include, for example, scheduling, multiplexing, and/or hybrid automatic repeat request (HARM) operations. Functions of RRM (as defined in the LTE standard) may include, for example, allocating, modifying, and releasing resources for transmission over the radio interface between a UE 2120A and the AP 2110. Functions of a SON (as defined in the LTE standard) may include, for example, functions to self-configure, self-optimize, and self-heal the network devices 2150. Alternatively, or additionally, an instance of eNodeB Function 2112A may perform at least a subset of functions of an element equivalent to an eNodeB in other wireless standards, such as, but not limited to, functions of a base transceiver station (BTS) as defined in the GSM/EDGE standard or a NodeB as defined in the UMTS/HSPA standard. In some embodiments, a UE 2120A may wirelessly connect to the AP 2110 in the 3.5 GHz shared band.

In some embodiments, an instance of eNodeB Function 2112A may be further configured to send/receive data to/from a corresponding instance of EPC Function 2114A. However, in contrast with the wireless access infrastructure 1000 of FIG. 1 that only uses standardized communication interfaces, an instance of the eNodeB Function 2112A in the AP 2110 may communicate with an instance of the EPC Function 2114A also executing in the AP 2110 using any interface or protocol. Because the eNodeB and EPC Functions execute on the same AP 2110, they do not need to be constrained to standardized communication interfaces. Instances of eNodeB Functions 2112A and EPC Functions 2114A may communicate with one another using, among other things, language-level method or procedure calls, remote-procedure call (RPC), Simple Object Access Protocol (SOAP), or Representational State Transfer (REST).

In some embodiments, an instance of the EPC Functions 2114A may be configured to provide at least some functions of a core network. For example, the exemplary instance of EPC Function 2114A may include functions such as, but not limited to, at least a subset of functions of the MME 1202, PGW 1206, SG-W 1204, and/or PCRF 1208 of EPC 1200 as defined in the LTE standard. An instance of the EPC Function 2114A, for example, may include a Mobility Management Function (MMF) which may perform at least a subset of functions of the MME 1202 (e.g., authentication functions) and the Optimized Packet Function (OPF) which may perform at least a subset of functions of the SG-W 1204 node and/or the PGW 1206 node (e.g., forwarding packets between the UE 2120A and one or more external data networks, such as the Internet 2600 and IPX 2400 via the appropriate Cloud service). In some embodiments, the instance of the EPC Functions 2114A may be configured to provide all functions of a core network.

In contrast with the MME 1202 node defined in the LTE standard, the MMF executing in the AP 2110 may communicate with the OPF using any protocol because both functions are implemented in the same EPC Function 2114A. On the other hand, in the EPC 1200, the MME 1202 node is connected to the SG-W 1204 using the standardized interface S11 and the SG-W 1204 is connected to the PGW node using the standardized interfaces S5/S8. In some embodiments, for example, the MME 1202 and the OPF node may communicate with one another using language-level methods or procedure calls, RPC, SOAP, or HTTP/REST.

Advantageously, an instance of eNodeB Function 2112A and/or EPC Function 2114A may implement the functions (or a subset of functions) of the eNodeB 1102 and/or the EPC 1200 using one or more services. For example, a service 2210A may include a distributed portion 2212A and a cloud portion 2214A. The distributed portion 2212A may be implemented within the AP 2110 and may provide application programming interfaces (APIs) that may be accessible by instances of eNodeB Functions 2112A-B and/or EPC Functions 2114A-B. The cloud portion 2214A of the service 2210A may be utilized by instances of the eNodeB Functions 2112A-B and/or EPC Functions 2114A-B through the associated distributed portion 2212A running on the AP 2110.

Unlike the wireless access infrastructure 1000, the exemplary cloud-based wireless access infrastructure 2000 may utilize available resources more efficiently, in part, because the services (e.g., 2110A-B) share the same pool of cloud-platform resources, and further, the cloud platform 2200 may dynamically reallocate resources to and from each service based on the service's resource needs. For example, in the cloud-based wireless access infrastructure 2000, the cloud platform 2200 may dynamically allocate computing resources, such as memory and CPU time, to various services based on each service's real-time demand for such resources. In contrast, a predetermined amount of resources would be dedicated to each node in the wireless access infrastructure 1000, and these resources cannot be distributed among the other nodes dynamically. Therefore, situations may exist in the wireless access infrastructure 1000 where the UE 1002A is denied service because one of the nodes (e.g., the MME 1202 of the EPC 1200) does not have sufficient amount of resources available for the UE 1002A, even when resources of other nodes have not been fully utilized.

The cloud-based wireless access infrastructure 2000 also has the advantage of enabling simplified network implementations relative to the wireless access infrastructure 1000. Because the AP 2110 is configured to implement one or more eNodeB Functions and EPC Functions, which conventionally were not deployed at the same server, the AP may leverage optimizations that previously were not available, such as combining the implementations of one or more of the eNodeB Functions and EPC Functions. In the context of LTE, for example, optimizations that combine one or more base-station and/or core-network functions in the AP, or that enable other optimizations in terms of resource management and/or allocations, may provide simplified LTE network implementations that were previously not possible. More generally, the cloud-based wireless access solution herein may be advantageously used to simplify and optimize implementations of various types of wireless access networks and is not limited to LTE-based solutions. Moreover, the capacity of the exemplary cloud-based wireless access infrastructure 2000 may be simpler and easier to scale up or down compared with the capacity of the wireless access infrastructure 1000. For example, the capacity of the cloud-based wireless access infrastructure 2000 may be increased by adding more resources available to the cloud platform 2200 and/or to the AP 2110. In contrast, capacities of multiple EPC 1200 nodes may need to be increased to increase the capacity of the wireless access infrastructure 1000.

In some embodiments, the cloud portion 2214A of the service 2210A may be implemented on the cloud platform 2200. Examples of cloud platforms include, *Eucalyptus* (an open-source cloud platform), Open Stack (an open-source cloud platform), and Amazon Web Service (AWS). In some embodiments, the cloud portion 2214A of the service 2210A may be stateless and communicate with the distributed portion 2212A of the service 2210A using a protocol supported by the cloud platform 2200 (e.g., HTTP/REST and SOAP are supported by AWS). In some embodiments, the cloud portion 2214A of the service 2210A may utilize a cloud portion 2214B of another service 2210B. In other embodiments, a cloud portion 2214C of a service 2210C may communicate with a conventional core network node in IPX 2400 by a standardized interface. In some embodiments, the cloud portion 2214C of the service 2210C may communicate with a server/application (e.g., Enterprise Identity and Authentication Application (EIAA) 2310) of the enterprise network 2300. In some embodiments, the cloud portion 2214C of the service 2210C may communicate with the SDN controller 2500 to provide instructions on how and which network devices of the network devices 2150 to configure/reconfigure. In some embodiments, a service may have a cloud portion only (i.e., without corresponding distributed portions), such as the cloud portion 2114B of the service 2210B. In some embodiments, the distributed portion 2212A of the service 2210A, in addition to exposing APIs to instances of eNodeB Functions 2112A-B and/or EPC Functions 2114A-B, may provide additional functions, such as caching. For example, when an API of the distribute portion 2212A of the service 2210A is being utilized to request data, the distributed portion 2212A, prior to communicating with its associated cloud portion 2214A to obtain the requested data, may determine whether the data is cached and/or whether the cached data is still valid.

Figure 4:
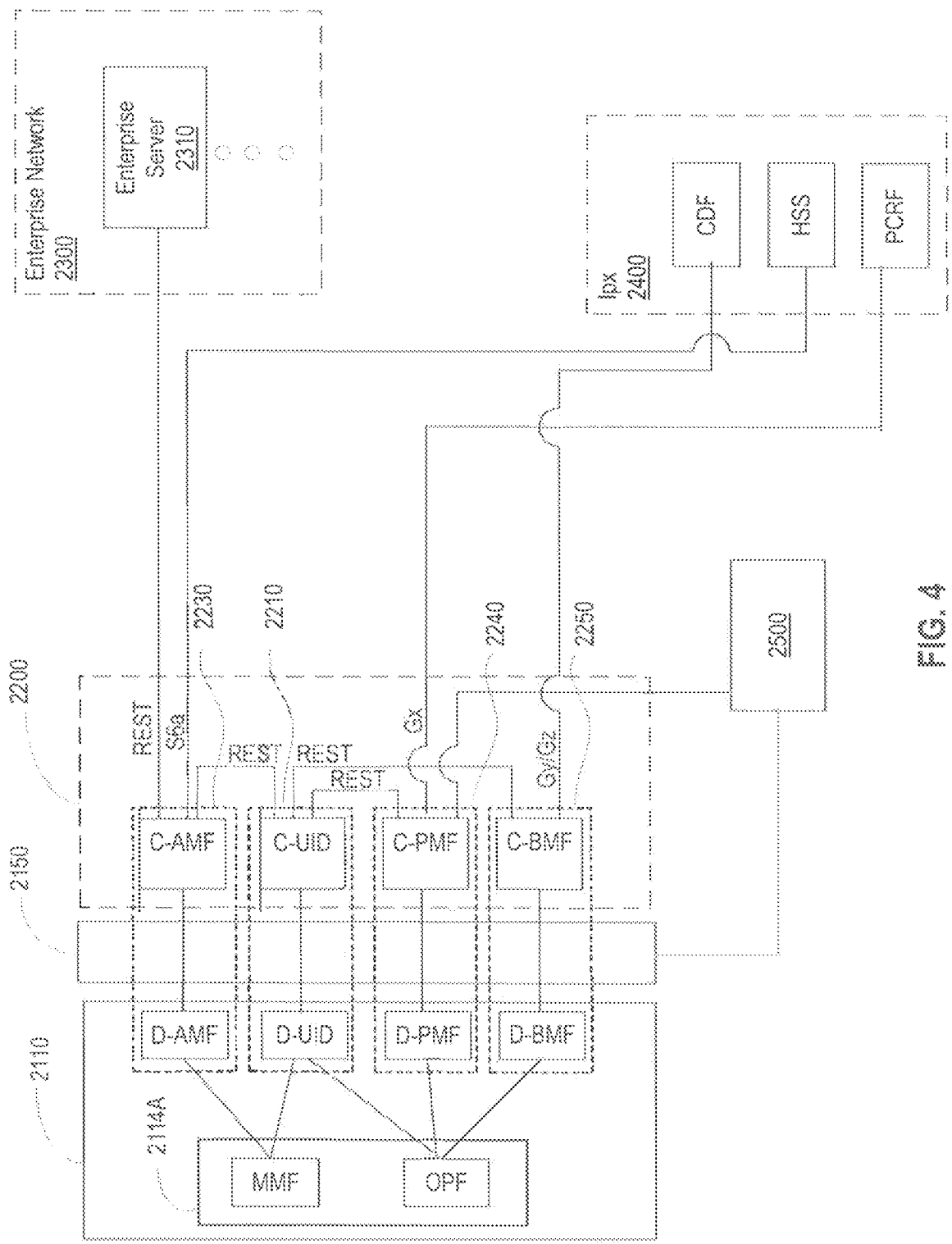
FIG. 4 illustrates a schematic block diagram of the exemplary cloud-based wireless access infrastructure of FIGS. 2 and 3 showing additional implementation details in accordance with the disclosed embodiments.

FIG. 4 illustrates a block diagram of the exemplary cloud-based wireless access infrastructure 2000 of FIGS. 2 and 3 in accordance with some embodiments. FIG. 4 illustrates additional implementation details that may be included in the exemplary cloud platform 2200, including various examples of services that may be used by instances of the EPC Functions 2114A-B. The exemplary services include, for example, User ID Service 2210, Operation, Administration, and Management Service 2220, Authorization Management Service 2230, and Policy Management Service 2240. The Authorization Management Service 2230 may be configured to authenticate a UE 2120A by communicating with the EIAA 2310 and/or one or more authentication nodes (e.g., HSS nodes) of external carriers in the IPX 2400. As shown in FIG. 4, the Authorization Management Service 2230 may include a distributed portion ("D-AMF") and a corresponding cloud portion ("C-AMF"), which is configured to communicate with the D-AMF. In some embodiments, the D-AMF may be stateless and implemented as a software program executing in the AP 2110, separate from the instances of software program(s) executing for the EPC Functions 2114A-B and eNodeB Functions 2112A-B, but still accessible by at least some of the instances of EPC Functions and eNodeB Functions. In some embodiments, communications between the D-AMF and the C-AMF may be encrypted, for example, using TLS or IPSec.

In some embodiments, the Authorization Management Service 2230 may authenticate the UE 2120A by using authentication and key agreement procedures, such as Evolved Packet System Authentication and Key Agreement (EPS AKA) and/or XOR-based algorithms, which may create keying materials for the RRC (Radio Resource Control) signaling, NAS (Non-Access Stratum) signaling, ciphering keys, and integrity keys. An authentication and key agreement procedure may be initiated, for example, after an LTE ATTACH request from the UE 2120A. In some embodiments, an LTE ATTACH request (the first step of an ATTACH procedure) may be sent from the UE 2120A to the AP 2110 when the UE 2120A is powered on and during the UE 2120A's initial access to the AP 2110. In some embodiments, the AP 2110 and the UE 2120A may use IMSI-based or GUTI-based ATTACH procedures, and an IP address (IPv4/IPv6) may be provided to the UE 2120A during the ATTACH procedure. In some embodiments, an instance of the eNodeB Function 2112A may forward information typically contained in an ATTACH Request message (as defined in the LTE standard) to the MMF of the corresponding instance of EPC Function 2114A. At least a portion of the information contained in the ATTACH Request message may be received from the UE 2120A. In some embodiments, the instance of the eNodeB Function 2112A may forward additional information such as the Selected Network, Tracking Area Identity (TAI), and EUTRAN Cell Global Identifier (ECGI) of the cell from where it received the message to the MMF of the corresponding instance of EPC Function 2114A.

FIG. 4 further shows services that enable instances of EPC Function 2114A-B to provide UEs 2120A-B with services that are not defined in the LTE standard. These additional services may include, for example, Billing Management Service 2250. According to the disclosed embodiments, the Billing Management Service (BMS) 2250 includes a distributed portion ("D-BMF") and a corresponding cloud portion ("C-BMF"), and may provide online and/or offline charging capabilities to an instance of the EPC Function 2114A. For example, an instance of the EPC Function 2114A may use APIs in the D-BMF to request the C-BMF to determine whether a UE 2120A is granted to use a network resource based on the account information (e.g., amount of data and minutes pre-paid by the user of the UE 2120A) and based on the network usage information (e.g., the amount of data or minutes currently used by the UE 2120A). In some embodiments, the C-BMF may receive the account information from the cloud portion of the User ID Service 2210, using for example HTTP/REST. In another example, an instance of the EPC Function 2114A may use APIs in the D-BMF to send the C-BMF information relating to the UE 2120A's network usage. In some embodiments, the C-BMF may transfer this information to an internal Billing Domain for the purposes of billing the user of the UE 2120A, inter-operator accounting, and/or monitoring usage of network resources.

In some embodiments, the C-BMF may send and/or receive network usage information to/from another carrier such that the UE 2120A's internal and external network usage may be tracked and/or controlled. For example, the C-BMF may communicate with a Charge Data Function (CDF) node of the carrier's EPC 1200 network through the IPX 2400 using standardized interfaces Gy and Gz.

As noted previously, the cloud platform 2200 may further include services having cloud portions only (i.e., without corresponding distributed portions), such as the cloud portion 2114B of the service 2210B. These services may include, for example, Integrated Authentication Management (IAM) Service, Skype Service, and Policy Service, and these types of services may communicate with other cloud portions of services. In some embodiments, the cloud platform 2200 may further include Emergency Management Service, Lawful Intercept Service, Roaming Management Service, and Paging Optimization Service, to provide additional examples.

Figure 5A:
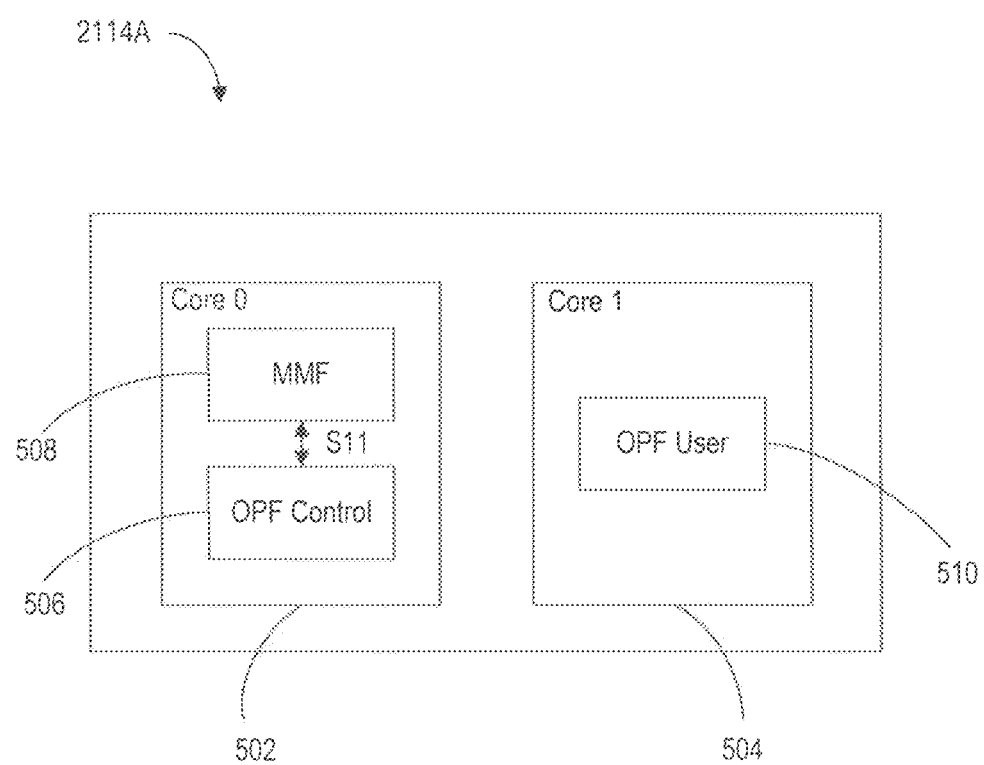
FIGS. 5A-5B illustrate exemplary instances of an EPC Function that may be implemented in accordance with the disclosed embodiments.
Figure 5B:
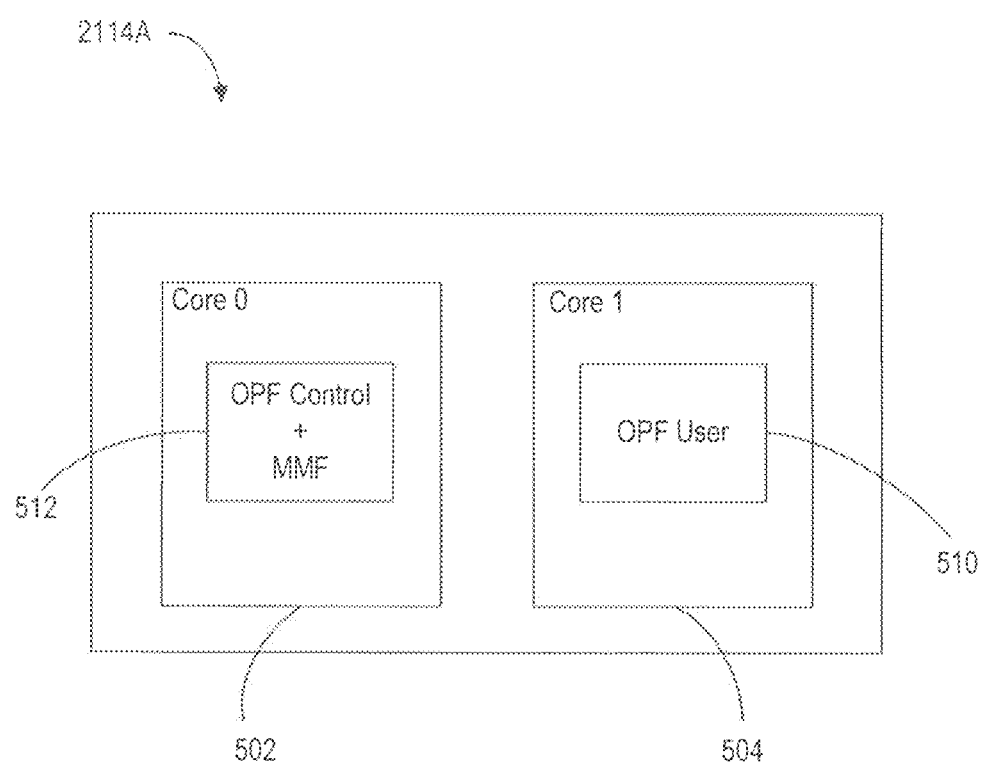

FIGS. 5A-5B illustrate exemplary instances of the EPC Function 2114A of FIG. 4. As noted previously, an instance of the EPC Function 2114A, for example, may include an MMF which may perform at least a subset of functions of the MME 1202 (e.g., authentication functions) and the OPF which may perform at least a subset of functions of the SG-W 1204 node and/or the PGW 1206 node (e.g., forwarding packets between the UE 2120A and one or more external data networks, such as the Internet 2600 and IPX 2400 via the appropriate Cloud service). In some embodiments, the OPF may be implemented using separate control-plane and user-plane portions. The OPF control-plane portion may perform at least some of the control and management functions of the SG-W 1204 and/or PGW 1206 nodes, and the OPF user-plane portion may perform data routing and processing functions of the SG-W 1204 and/or PGW 1206. The control-plane functions of the SG-W 1204 and/or PGW 1206 may include, for example, functions to communicate with services on a cloud platform. User-plane functions of the SG-W 1204 and/or PGW 1206 may include, for example, functions that create or process data packets (e.g., Transmission Control Protocol (TCP), User Datagram Protocol (UDP), and/or Internet Protocol (IP)) and communicate data packets to an eNodeB and/or external networks. In some embodiments, the user-plane portion of the OPF may include the user-plane functions of the PGW 1206 without also including user-plane functions of the SG-W 1204. In such embodiments, the OPF user-plane portion may communicate with external networks while bypassing the user-plane functions of the SG-W 1204 node.

In some embodiments, as shown in FIG. 5A, the MMF 508 and the OPF control-plane portion 506 may be executed on a first processor core 502 of the AP 2110, and the OPF user-plane portion 510 may be executed on a second processor core 504 of the AP 2110. In this way, the AP 2110 may reduce signaling overhead between the MMF 508 and the OPF control-plane portion 506 executing in the first processor core. For example, the MMF 508 may communicate with the OPF control-plane portion 506 in the first processor core 502 using, for example, the s11 interface protocol. The MMF 508 and the OPF control-plane portion 506 may communicate with the OPF user-plane portion 510 using a proprietary protocol.

Alternatively, as shown in FIG. 5B, a single function 512 implementing both the OPF control-plane portion 506 and the MMF 508 (e.g., as a single binary application) may be executed on the first processor core 502 of the AP 2110, and the OPF user-plane portion 510 may be executed on the second processor core 504 of the AP 2110, which may further reduce the signaling overhead between the OPF control-plane portion 506 and the MMF 508 (e.g., by eliminating use of the s11 interface protocol).

In some embodiments, the OPF user-plane portion may use one or more TUN devices for communicating with external networks, eNodeB, and/or the OPF control-plane portion. For example, the OPF user-plane portion in the AP 2110 may include, or be connected to, a first TUN device for handling data packets to/from external networks. Additionally, the OPF user-plane portion in the AP 2110 may include, or be connected to, second and/or third TUN devices for handling data packets to/from an eNodeB. The use of TUN device(s) may reduce the memory and CPU usage in the AP 2110. Alternatively, the OPF user-plane portion in the AP 2110 may communicate with an eNodeB using UDP-based sockets. And in some embodiments, the OPF user-plane portion may utilize Intel's NTL socket libraries, leveraging an Inter-Cluster Communication (ICC) memory model to communicate with an eNodeB and/or external networks. In accordance with the disclosed embodiments, persons skilled in the art will appreciate that the AP 2110 may implement the OPF and MMF functions in various ways that may optimize resource usage in the AP 2110, for example, by reducing the amount of signaling or processing in the AP, compared with conventional EPC implementations.

Figure 6:
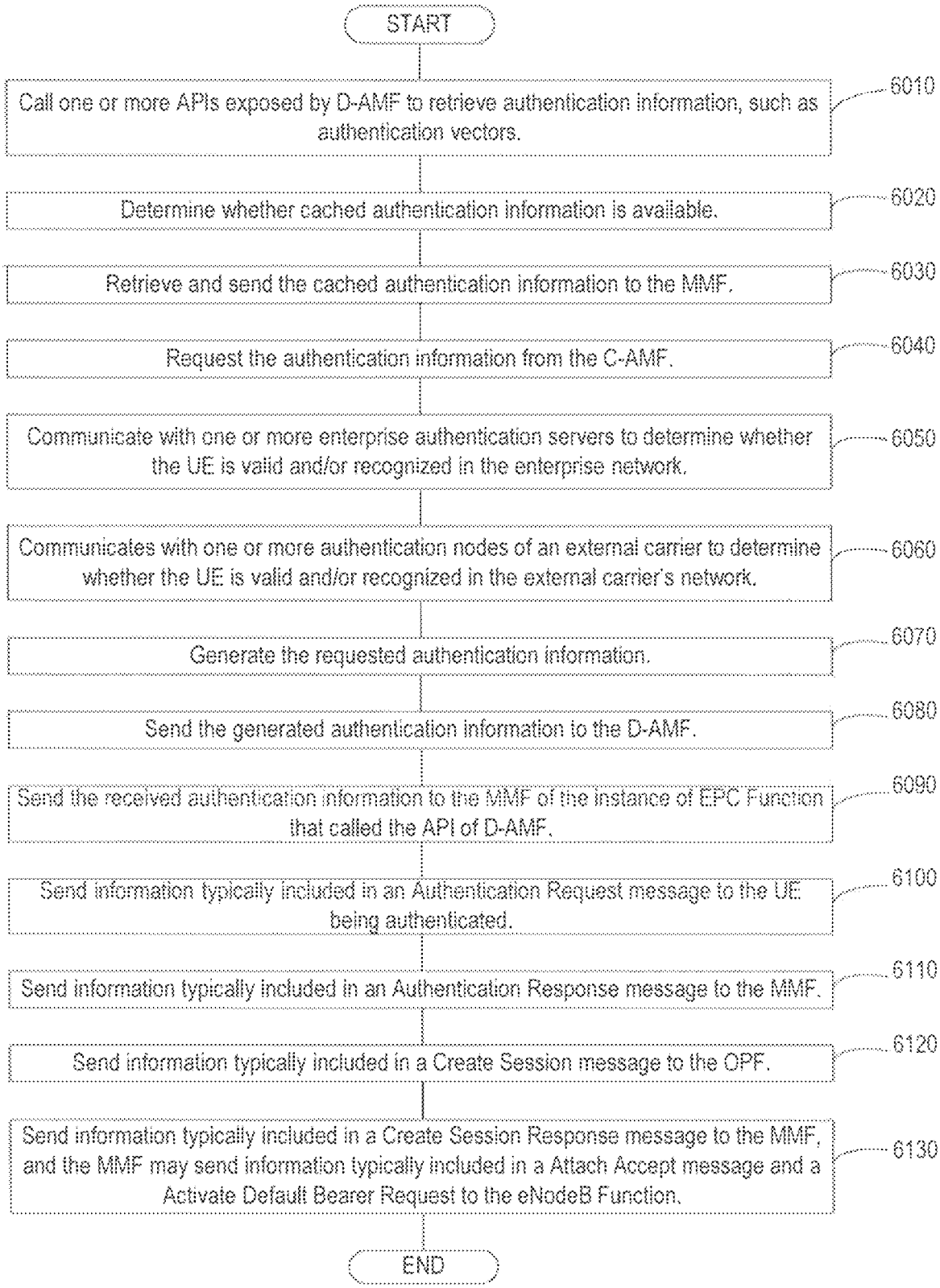
FIG. 6 is a flow diagram of an exemplary authentication and key agreement procedure in accordance with the disclosed embodiments.

FIG. 6 is a flow diagram of an exemplary authentication and key agreement procedure 6000 according to some embodiments. At step 6010, the MMF may call one or more APIs exposed by the D-AMF to retrieve authentication information, such as one or more authentication vectors. At step 6020, the D-AMF may determine whether cached authentication information is available. For example, the D-AMF may query a database containing cached authentication information. If the cached authentication information is available, at step 6030, the D-AMF may retrieve and send the cached authentication information to the MMF. If the cached authentication information is unavailable, at step 6040, the D-AMF may request the authentication information from the C-AMF. As noted previously, the D-AMF may communicate with the C-AMF using any cloud protocols supported by the cloud platform 2200.

After receiving the request, the C-AMF may determine whether the UE being authenticated is valid and recognized, for example, by using International Mobile Subscriber Identity (IMSI) information associated with the UE. For example, at step 6050, the C-AMF may communicate with one or more enterprise authentication servers to determine whether the UE is valid and/or recognized in the enterprise network 2300. The C-AMF may communicate with the EIAA 2310, such as Microsoft Active Directory, using a Single-Sign-On procedure or a Lightweight Directory Access Protocol (LDAP). In some embodiments, the C-AMF may communicate with an EIAA 2310 via an intermediate service cloud portion, such as Integrated Authentication Management (IAM) Plugin Authentication Policy Service.

At step 6060, the C-AMF communicates with one or more authentication nodes of an external carrier to determine whether the UE is valid and/or recognized in the external carrier's network. For example, the C-AMF may communicate with one or more Home Subscribe Server (HSS) node of an external carrier via a S6a interface (defined in the LTE standard) to determine whether the UE is valid and/or recognized by the external carrier(s). Advantageously, because the C-AMF can be used to manage all communications with the authentication servers or nodes, the MMF may authenticate the UE for multiple EIAAs and/or multiple authentication nodes using a single authentication and key agreement procedure. In contrast, the EPC 1200 in the wireless access infrastructure 1000 would be able to authenticate a UE only for 3GPP access, and all enterprise authentication functions are executed as separate follow-on steps.

In some embodiments, the C-AMF may communicate with one or more HSS nodes of an external carrier via another cloud portion of a service ("S6a interface microservice"), which in turn communicates with the HSS nodes using a S6a interface.

At step 6070, if the UE is determined to be valid and recognized by the enterprise network 2300 and/or the external carrier at steps 6050 and 6060, the C-AMF may generate the requested authentication information, including for example, the authentication vector. In some embodiments, the generated authentication information may further include a base key, such as a KASME. At step 6080, the C-AMF may send the generated authentication information to the D-AMF. At step 6090, the D-AMF may send the received authentication information to the MMF of the instance of the EPC Function in the AP 2110 that called the API of the D-AMF.

At step 6100, the MMF may send information typically included in an Authentication Request message (as defined in the LTE standard) to the UE being authenticated. The Authentication Request message may contain parameters necessary to calculate the information typically included in an Authentication Response message (as defined in the LTE standard), including the calculated base key, such as a KASME.

At step 6110, the UE may send information typically included in an Authentication Response message (as defined in the LTE standard) to the MMF. In some embodiments, the UE may store a copy of the base key (e.g., KASME) within the UE. In some embodiments, the MMF may establish a security association between the UE and the MMF to protect the subsequent messages between the UE and the MMF, for example, by sending information typically included in a Security Mode Command (SMC) message. Additionally, the MMF may send information such as selected NAS algorithms, eKSI, ME Identity request, and UE security capability to the UE. Upon receiving the information typically included in the SMC message, the UE may check whether the security mode command can be accepted or not by checking the integrity of the message.

At step 6120, after the security association between the UE and the MMF is established, the MMF may send information typically included in a Create Session message (as defined in the LTE standard) to the OPF. In some embodiments, the OPF may send information typically included in a Credit Control Request (as defined in the LTE standard) to the C-PMF via the D-PMF, and the D-PMF may forward the default policy rules to the OPF. Policy rules may include, for example, quality of service information associated with the UE.

At step 6130, the OPF may send information typically included in a Create Session Response (as defined in the LTE standard) message to the MMF, and the MMF may send information typically included in a ATTACH Accept message and an Activate Default Bearer Request (as defined in the LTE standard) to an instance of the eNodeB Function 2112A. In some embodiments, the C-PMF may retrieve policy from an Enterprise Policy and QoS applications. Additionally, or alternatively, the C-PMF may retrieve policy from a node of another carrier (e.g., Policy and Charging Rules Function (PCRF)) via the IPX 2400 and using a standard Ox interface. Furthermore, the C-PMF may instruct the SDN controller 2500 to reconfigure the network devices 2150 based on the retrieved policy. For example, in some embodiments, the retrieve policy may include a QoS requirement for a UE, and the C-PMF may instruct the SDN controller 2500 to reconfigure the network device 2150 to provide the required QoS to the UE (and to the instance of the EPC Function 2114A assigned to the UE).

In the wireless access infrastructure 1000, the communication between UEs, eNodeB, MME 1202, SG-W 1204, PGW 1206, HSS, and HCRF are performed using standardized messages/protocols defined in the LTE standard, such as Authentication Information Request/Answer, Authentication Request/Response, Secure Mode Command, Security Mode Complete, and Create Session Request/Response. However, as described above, the communications between the UEs, MMF, OPF, D-AMF, and C-AMF may be done using any message format and/or protocol.

Figure 7:
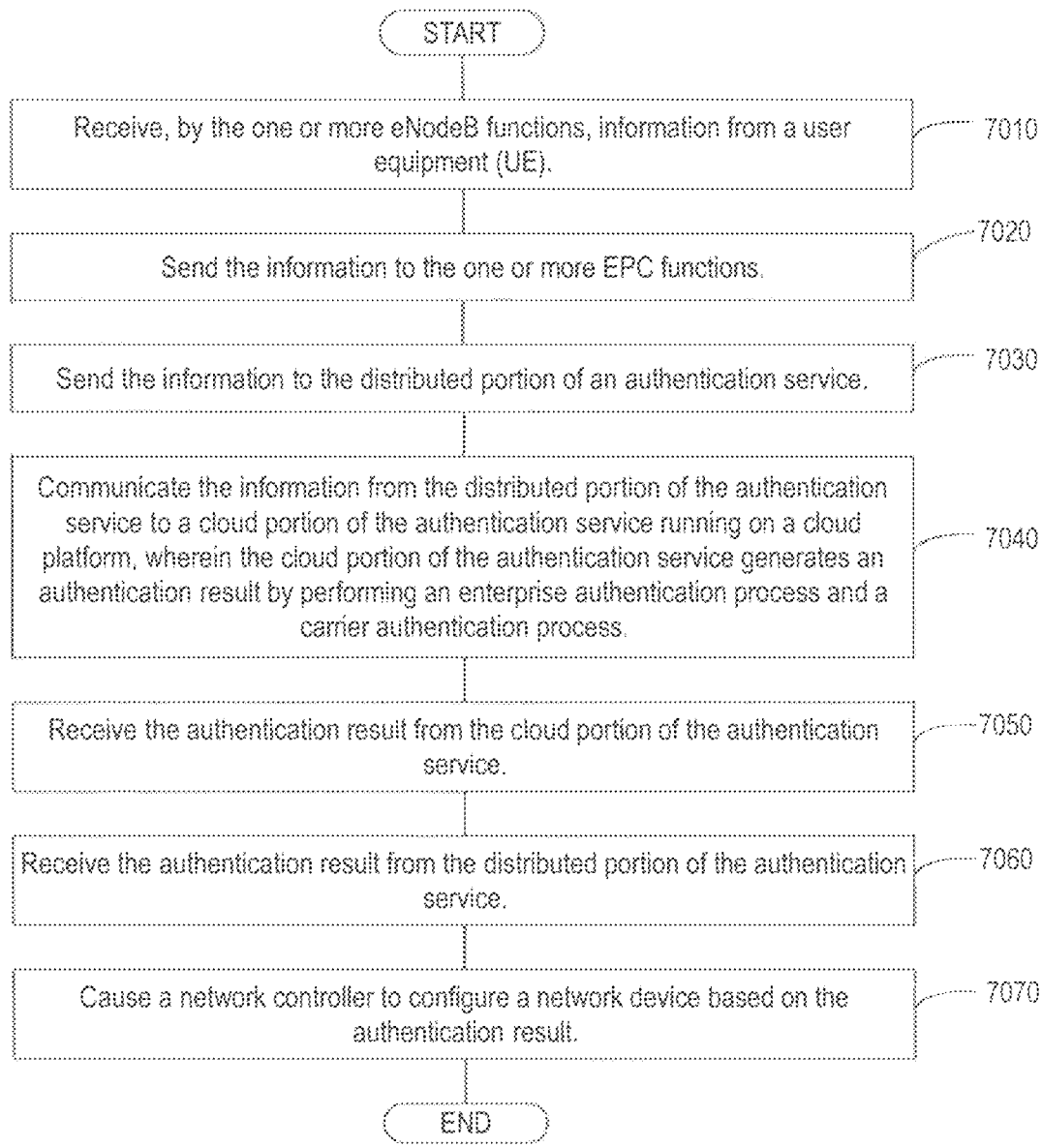
FIG. 7 is a flow diagram illustrating a sequence of steps that may be performed by an AP in accordance with the disclosed embodiments.

FIG. 7 is a flow diagram of a process 6000 performed by an AP 2110 in accordance with the disclosed embodiments. The AP 2110 may execute a set of one or more base-station functions for use by a UE, a set of one or more core-network functions, and a distributed portion of a service. At step 7010, the set of one or more base-station functions may receive information from the UE. At step 7020, the set of one or more core-network functions may receive the information from the set of one or more base-station functions. At step 7030, the distributed portion of the service may receive the information from the one or more core-network functions. At step 7040, the distributed portion of the service may communicate the information to a corresponding cloud portion of the service running on a cloud platform 2200. In some embodiments, the service may be provided by a combination of the distributed portion and the cloud portion of the service. At step 7050, the distributed portion of the service may receive a response from the cloud portion of the service based on processing performed by the cloud portion on the cloud platform.

At an optional step, the distributed portion of the service may send the response to the set of one or more core-network functions in accordance with the disclosed embodiments. Alternatively, or additionally, the distributed portion of the service may send a message derived from the received response to the set of one or more core-network functions. At another optional step, the set of one or more core-network functions may send the received response/message (or another message derived from the received response/message) to the set of one or more base-station functions in accordance with the disclosed embodiments. In some embodiments, the set of one or more base-stations functions, after receiving the response/message, may send the response/message to the UE. Alternatively, or additionally, the set of one or more base-stations functions may send another message derived from the received response/message to the set of one or more core-network functions.

In some embodiments, the cloud-based wireless access infrastructure 2000 may establish each user's connection to the wireless access infrastructure as an end-to-end set of resources across multiple functional layers. For example, an instance of eNodeB Function 2112A in the AP 2110 may use services to implement the air interface layers (e.g., PHY and MAC layers) and radio access layer (e.g., RRM), and the MMF and the OPF of an instance of the EPC Function 2114A, and may further use services to implement an enterprise network layer, cloud resource layer, and enterprise application layer. This connected set of resources across multiple layers representing a UE's wireless connectivity may enable configuration of the network devices 2150 to provide different QoS and ranges of services for each user, handling mobility of the user across dissimilar wireless networks, and other desired infrastructure behavior configured on a per-user basis.

Mobility Functionality

Embodiments address UE mobility requirements in a network deployment such as the exemplary cloud-based wireless access infrastructure 2000 where each AP 2110 encompasses at least a subset of eNodeB functionality as well as at least a subset of EPC functionality. As disclosed below, embodiments provide IP address continuity, inter-AP signaling, paging support, tracking area functionality, etc., for such APs.

IP Address Allocation

Generally, in a conventional LTE network such as the exemplary LTE wireless access infrastructure 1000, the PGW 1206 is responsible for allocating an IP address to each UE (e.g., UEs 1002A and 1002B). The PGW 1206 in a conventional LTE network such as the exemplary LTE wireless access infrastructure 1000 is a centralized entity that provides packet processing functionality to many eNodeBs 1102 (or access point nodes), and therefore serves as a centralized packet processing entity for all the UEs 1002A and 1002B connecting to all these eNodeBs 1102. Being a centralized entity, the IP address that an LTE PGW provides for an LTE UE in a typical network remains the same as the UE moves from one eNodeB to another eNodeB (or access point node to access point node) while it moves around in the network, since the PGW that the UE is talking to does not change.

As described herein, in the exemplary cloud-based wireless access infrastructure 2000, AP 2110 includes OPF which provides at least a subset of the packet processing (or PGW 1206) functionality. In one embodiment, OPF may only provide simplified and/or modified functionalities of an LTE PGW. For example, OPF may not include the IP address allocation provided by an LTE PGW, since if the OPF in each AP 2110 in the exemplary cloud-based wireless access infrastructure 2000 allocates an IP address to a UE, the UE's IP address would keep changing as the UE moves from one AP 2110 to another (or access point node to access point node) since the UEs 2120A and 2120B would be connecting to the equivalent of an LTE PGW in each AP 2110. Therefore, one embodiment keeps the IP address of the UEs 2120A and 2120B the same regardless of their mobility in the exemplary cloud-based wireless access infrastructure 2000.

In one embodiment, the AP 2110 implements IP address allocation using DHCP. In one embodiment, one or more external DHCP servers perform the IP address allocation to the UEs 2120A and 2120B. In one embodiment, the DHCP servers are outside the OPF function that resides in each AP 2110. For example, in one embodiment, the network devices 2150 may include the DHCP servers as described herein with reference to FIG. 2. In one embodiment, the DHCP servers are centralized entities in the exemplary cloud-based wireless access infrastructure 2000.

Figure 8:
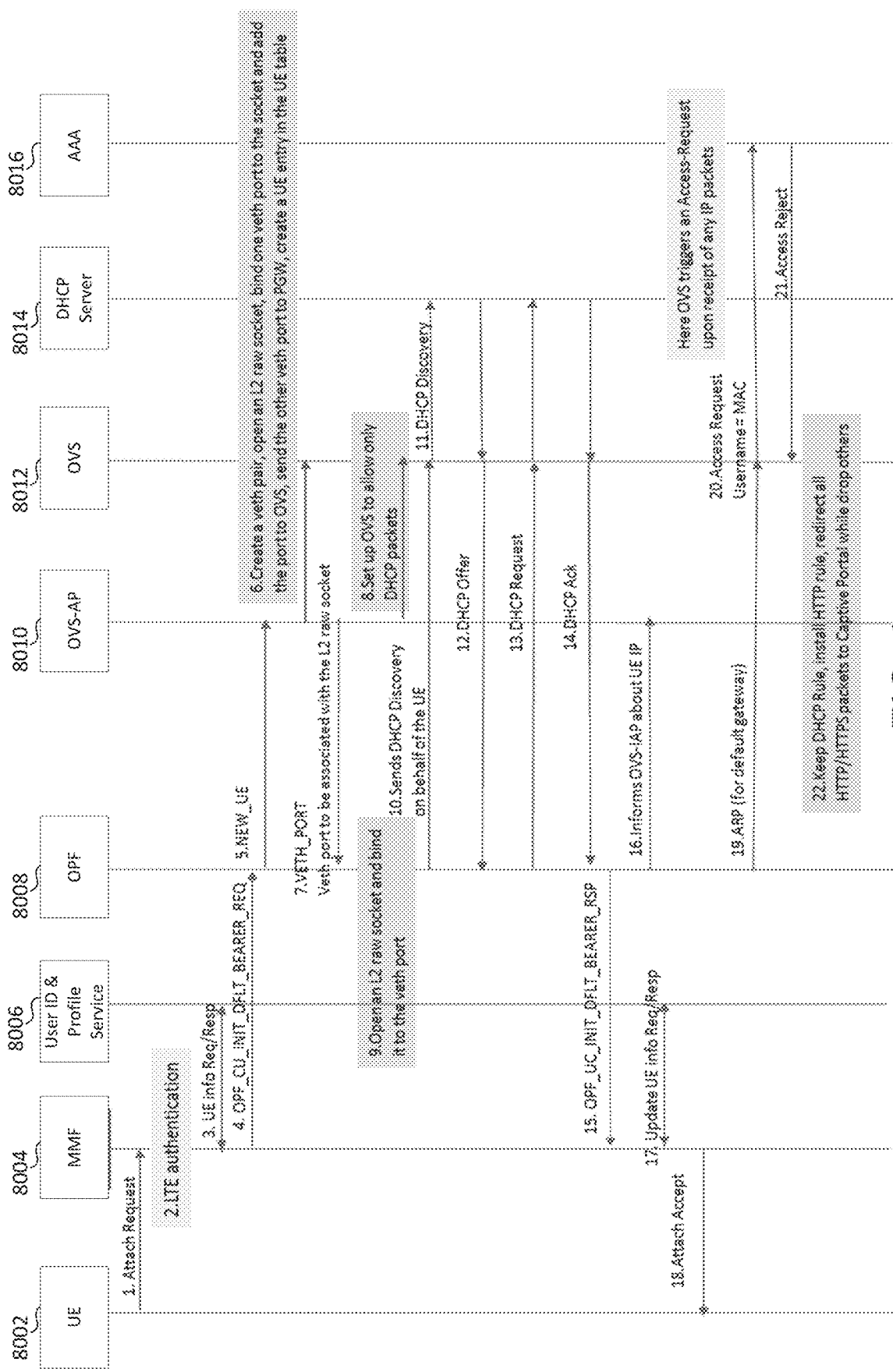
FIG. 8 is an example call flow for using one or more DHCP servers to allocate IP addresses to UEs in accordance with the disclosed embodiments.

FIG. 8 illustrates an example call flow for using one or more DHCP servers 8014 to allocate IP addresses to a UE 8002, according to an embodiment. The MMF 8004 and the OPF 8008 illustrated in FIG. 8 are functions implemented by an access point such as AP 2110 in the exemplary cloud-based wireless access infrastructure 2000. At (1) when the MMF 8004 receives an "Attach Request" message from a new UE 8002, at (2) an LTE authentication procedure is performed. At (3) the MMF 8004 then sends a "UE information request" message to a cloud User ID and Profile Service 8006 IMSI as a parameter. In one embodiment, for example, the cloud User ID and Profile Service 8006 may be provided by the cloud platform 2200. The User ID and Profile Service 8006 uses the IMSI as a lookup key in the database and returns the corresponding UE MAC address in a "UE Information Response" message. If the MMF 8004 cannot reach the cloud User ID and Profile Service 8006, it returns a failure message, and the attach procedure is aborted by sending an "Attach Reject" message to the UE 8002.

At (4) after receiving the UE MAC address from the service 8006, the MMF 8004 sends an "OPF_CU_INIT_DEFAULT_BEARER_REQ" message to the OPF 8008 with the UE MAC address. The OPF 8008 then talks to an Open vSwitch (OVS) function in the AP 2110 (OVS-AP 8010) using a UNIX domain socket. Specifically, at (5) the OPF 8008 sends a "NEW_UE" request to the OVS-AP 8010 with the UE MAC address. If the OVS-AP 8010 returns a failure, the attach procedure is aborted by sending an "Attach Reject" to the UE 8002. Otherwise, at (6) the OVS-AP 8010 and OVS 8012 create a virtual Ethernet (VETH) pair. The OVS 8012 opens a layer 2 (L2) raw socket and binds the socket to one VETH port. The OVS-AP 8010 adds that VETH port to the OVS 8012, at (7) sends the other VETH port from the pair to the OPF 8008 in a "VETH_PORT" message, and creates a UE entry in a UE table in its database. The OVS-AP 8012 also at (8) sets up the OVS 8014 in AP 2110 to allow only DHCP packets for the UE 8002.

Upon receiving the "VETH_PORT" message from the OVS-AP 8010, at (9) the OPF 8008 opens an L2 raw socket and binds to the VETH port using the L2 raw socket. Then, at (10) the OPF 8008 triggers an IP address allocation procedure from the DHCP server 8014 for the UE 8002. In order to do so, the OPF 8008 sends "DHCP Discover" packets to the OVS 8012 using the L2 raw socket with the UE MAC address as source MAC. At (11) the OVS 8012 sends the "DHCP Discover" packets to the DHCP server 8014 (these packets are broadcast). At (12) the DHCP server 8014 sends a "DHCP Offer" message to the OPF 8008 through the OVS 8012. In some embodiments, multiple DHCP servers can send their offers if there are multiple DHCP servers in the system.

At (13) the OPF 8008 accepts one offer and sends a "DHCP Request" message with the accepted offer to the DHCP server 8014 through the OVS 8012. This packet is also broadcast. Other DHCP Servers withdraw their offers and at (14) the accepted DHCP server 8014 sends a "DHCP Acknowledgement (ACK)" message to the OPF 8008 through the OVS 8012 to confirm the IP allocation. The OPF 8008 maintains the DHCP server 8014 address.

The allocated IP address has a lease time. Accordingly, in one embodiment, the OPF 8008 starts three timers T1, T2, and T3 for the UE 8002 such that T3 is the time till lease expiry, T1 is a configurable time such that T1<T3, T1 indicating when a lease renew from the particular DHCP server 8014 (unicast) has to be attempted, and T2 is a configurable time such that T1<T2<T3, T2 indicating when a lease renew from any DHCP server (broadcast) has to be attempted. These timers are described in further detail below with reference to DHCP lease renew.

In one embodiment, if the IP address allocation fails, the OPF 8008 closes the L2 raw socket and sends a "Release UE" request to the OVS-AP 8010 and the attach procedure is aborted by sending an "Attach Reject" message to the UE 8002. If the IP allocation succeeds, at (15) the OPF 8008 sends an "OPF_UC_INIT_DEFAULT_BEARER_RESP" message to MMF 8004 with the allocated IP address. At (16) the OPF 8004 also sends the allocated IP address to the OVS-AP 8010, and the OVS-AP 8010 updates its UE context with the allocated IP address.

At (17) the MMF 8004 sends the allocated IP address, the IMSI, and the serving AP ID to the cloud User ID and Profile service 8006. The service 8006 updates this information in the UE context in the database and sends a corresponding response to the MMF 8004. If the MMF 8004 cannot reach the cloud User ID and Profile service 8006, the MMF 8004 returns a failure and sends a "Release UE" request to the OPF 8008. The OPF 8008 stops the lease timers T1, T2, and T3, closes the L2 raw socket, and sends a "Release UE" request to the OVS-AP 8010. The MMF 8004 aborts the attach procedure by sending an "Attach Reject" message to the UE 8002. In case of no failure, at (18) the MMF 8002 completes the UE 8002 attach procedure by sending an "Attach Accept" message to the UE 8002.

The remaining steps in FIG. 8 describe the option where UE 8003 (after the completion of the LTE Attach process) is redirected, via the AAA server 8016, to a web-based Captive-portal for logging in, either using credentials or as a guest. Such an option is often prevalent in enterprise networks where a user has to log into a web-based captive portal to access the internet and enterprise services (for example, when one tries to log into an airport's WiFi network).

In one embodiment, the OVS 8012 triggers an "Access Request" upon receipt of any IP packets. For example, in one embodiment, at (19) the OPF 8008 sends a Gratuitous Address Resolution Protocol (GARP) to the OVS 8012 with the UE 8002 MAC and IP address. At (20) the OVS 8012 sends an "Access Request" to enterprise Accounting, Authentication, and Authorization (AAA) server 8016 with username as the UE 8002 MAC address. At (21) the AAA 8016 rejects the request as enterprise authentication has not been performed. At (22) the DHCP rules are retained at the OVS 8012 for DHCP IP address renewal later on. Additionally, HTTP forwarding rules are installed at the OVS 8012 so that any traffic from the UE 8002 can be redirected to a Captive portal (such as a web-service or mobile device app) for authentication.

DHCP Lease Renewal

In one embodiment, once the OPF DHCP client completes the UE IP address allocation or reallocation process, it enters the BOUND state. In this state, the OPF 8008 is in its regular operating mode, with a valid IP address and other configuration parameters it received from the DHCP server 8014. While the OPF 8008 is in the BOUND state, the OPF DHCP client lies dormant. In one embodiment, the OPF DHCP client "wakes up" and come active again upon arrival of the time when the lease is to be renewed. The renewal ensures that a lease is perpetuated so it can be used for a prolonged period of time. To manage the lease extension process, the three timers described above with reference to IP allocation are set at the time that a lease is allocated. The renewal timer T1 goes off to tell the OPF 8008 it is time to try to renew the lease with the server 8014 that initially granted it. The rebinding timer T2 goes off if the OPF 8008 is not successful in renewing with that server 8014, and indicates to the OPF 8008 to try any DHCP server to have the lease extended. If the lease is renewed or rebound, the OPF 8008 goes back to normal operation. If the lease cannot be rebound, it expires and the OPF 8008 needs to detach the UE 8002 at T3 timer expiry.

Figure 9:
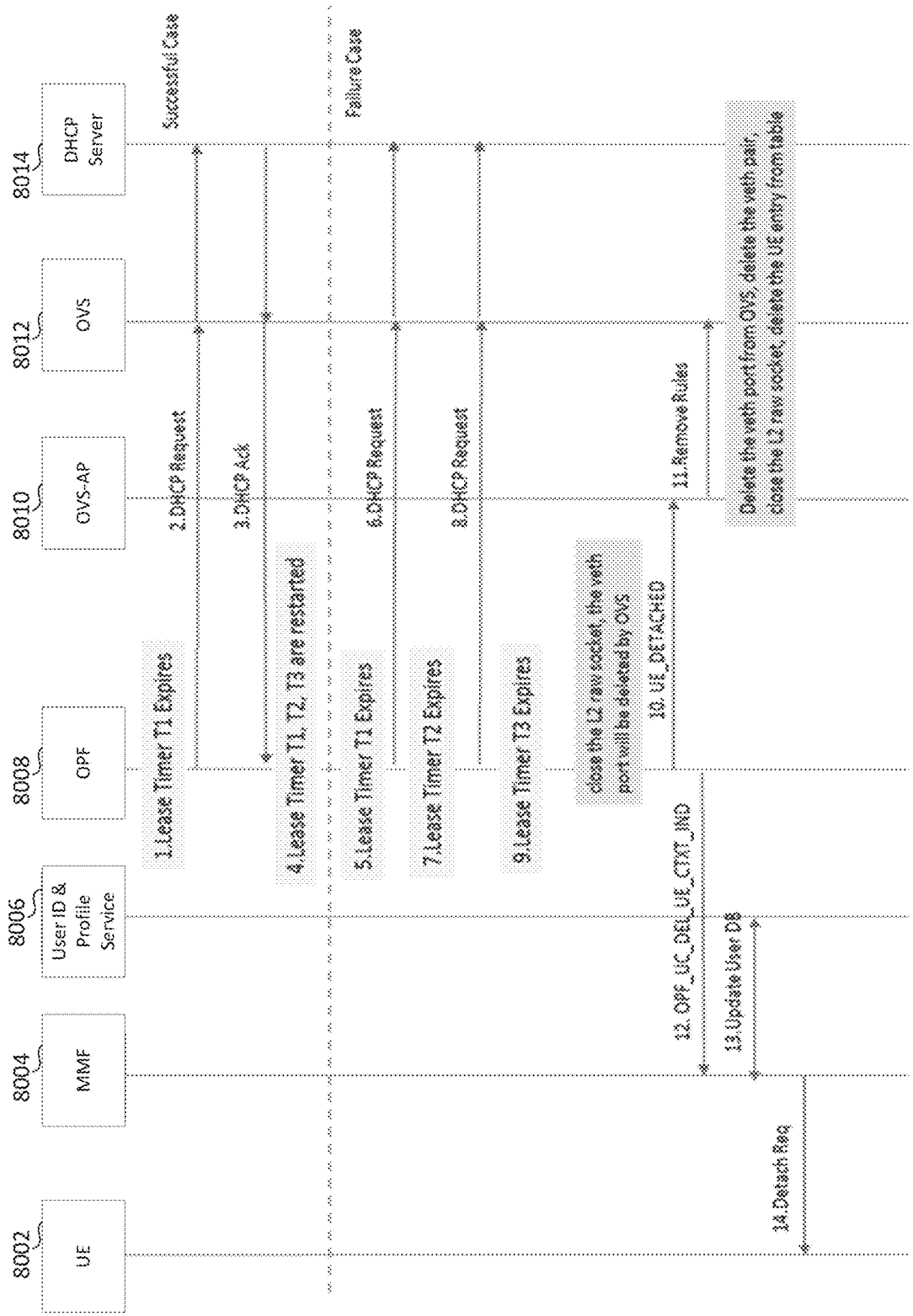
FIG. 9 illustrates an example UE IP Address DHCP Lease Renew Message Sequence in accordance with the disclosed embodiments.

FIG. 9 illustrates an IP Address DHCP Lease Renew Message Sequence according to an embodiment. When at (1) a Lease Timer T1 expires for a UE 8002 at the OPF 8008, at (2) the OPF 8008 sends a "DHCP Request" (Unicast) to the particular DHCP server 8014 that allocated the UE IP. These requests are retransmitted periodically if an answer is not received. If the DHCP server renews the lease, at (3) the DHCP server 8014 responds with a "DHCP ACK" message and extends the lease time, and at (4) the OPF 8008 stops sending "DHCP Requests" and restarts timer T1, T2, and T3.

If the DHCP server does not renew the lease, at (5) the Lease Timer T1 expires for the UE 8002 at the OPF 8008. At (6) the OPF 8008 sends a "DHCP Request" message (Unicast) to particular DHCP server 8014 that allocated the UE IP address. These requests are retransmitted periodically if an answer is not received. At (7) Timer T2 expires if the DHCP server 8014 does not respond. At (8) the OPF 8008 sends a "DHCP Request" (Broadcast) to all DHCP servers. These requests are retransmitted periodically if an answer is not received. If some DHCP server responds with a "DHCP Ack" with lease extension, then the OPF 8008 stops sending "DHCP Requests" and restarts timer T1, T2, and T3 as done at (4).

At (9) Timer T3 (the initial lease time value) expires if none of the DHCP servers respond. At this time, the IP address is no longer valid. The OPF 8008 triggers UE release process. Specifically, at (10) the OPF 8008 closes the L2 raw socket (the VETH port is deleted by the OVS 8012) and sends a "UE_DETACHED" request to the OVS-AP 8010. At (11) the OVS-AP 8010 removes rules for the UE 8002 from the OVS 8012, closes the L2 raw socket, deletes the VETH pair, and deletes the UE entry from the table. At (12) the OPF 8008 sends an "OPF_UC_DEL_UE_CTXT_IND" message to the MMF 8004. In response, at (13) the MMF 8004 sends an "Update User DB" message to the cloud User ID and Profile service 8006, and the UE 8002 is marked as detached and serving AP ID and IP address are dissociated in the UE context in the cloud User ID and Profile Service 8006. At (14) the MMF 8004 completes the Detach UE procedure by sending a "Detach Request" message to the UE 8002.

UE IP Address Release

Figure 10:
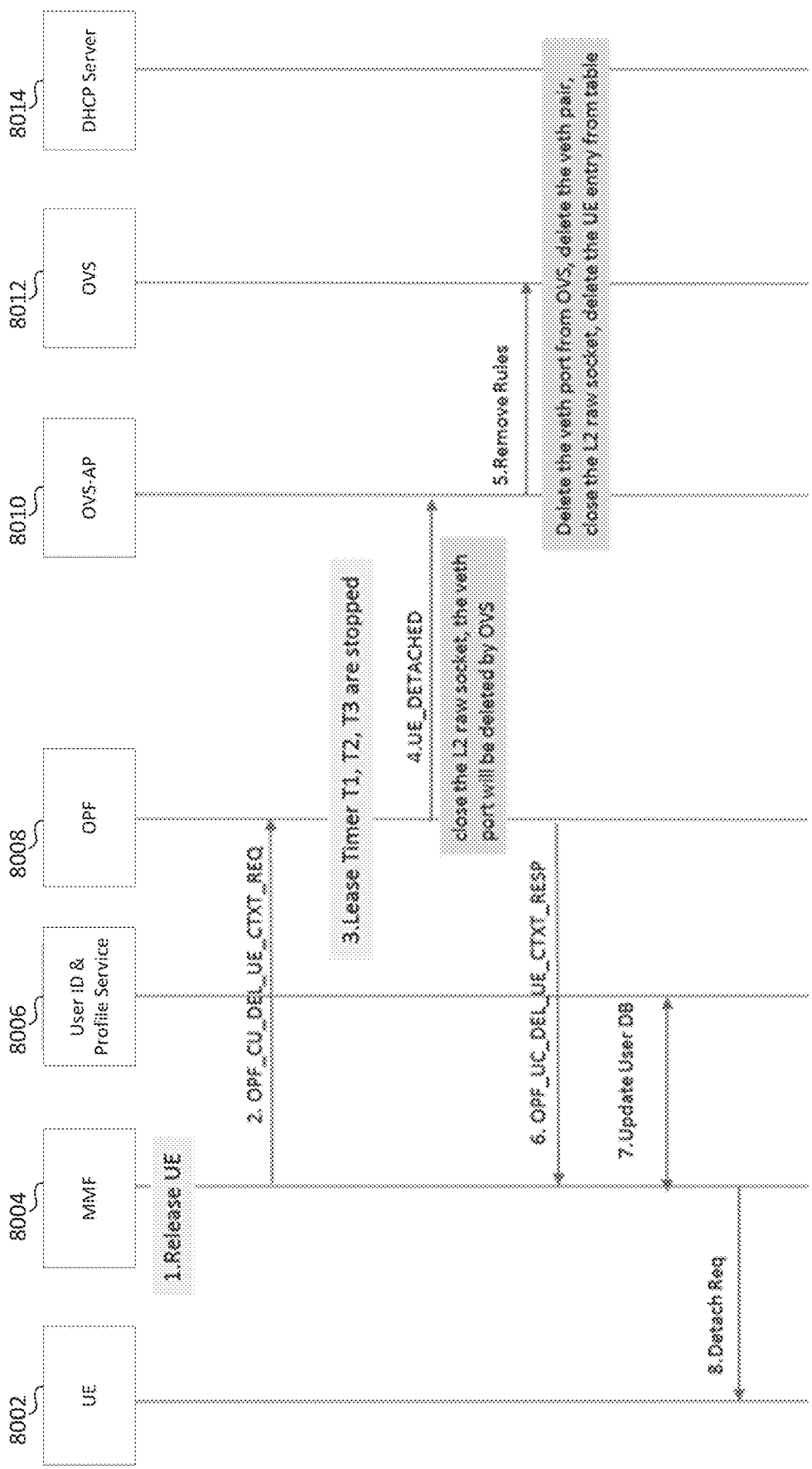
FIG. 10 is an example message sequence for UE IP Address Release in accordance with the disclosed embodiments.

FIG. 10 is an example message sequence for UE IP Address Release according to an embodiment. At (1) the UE release procedure is triggered at the MMF 8004. The trigger may come from the UE 8002 or may be an implicit trigger due to other reasons. At (2) the MMF 8004 sends an "OPF_CU_DEL_UE_CTXT_REQ" request to the OPF 8008. At (3) the OPF 8008 stops lease timers T1, T2, and T3. At (4) the OPF 8008 closes the L2 raw socket (the VETH port is deleted by the OVS 8012) and sends a "UE_DETACH" request to the OVS-AP 8010. At (5) the OVS-AP 8010 removes rules for the UE 8002 from the OVS 8012, deletes the VETH port, closes the L2 raw socket, deletes the VETH pair, and deletes the UE entry from the table. At (6) the OPF 8008 sends an "OPF_UC_DEL_UE_CTXT_RESP" message to the MMF 8004. At (7) the MMF 8004 sends an "Update User DB" message to the cloud User ID and Profile service 8006. At (8) the MMF 8004 completes the procedure by sending a "Detach Req" message to the UE 8002.

Mobility Across APs

Embodiments provide mobility across APs in the exemplary cloud-based wireless access infrastructure 2000. Embodiments provide connected mode mobility and idle mode mobility. In one embodiment, the MMF and OPF context moves from the source AP to the target AP when a UE moves within the afore-mentioned network, as described in detail below with reference to various embodiments.

Connected Mode Mobility

One embodiment implements a messaging functionality between APs and the cloud to orchestrate a hand-off in a mobility scenario (a UE moving from one AP to another) without changing the IP address of the UE. In one embodiment, the AP to AP communication leverages the X2 interface mechanism defined between eNodeBs, but also leverages the L2 connectivity between the APs.

Figure 11:
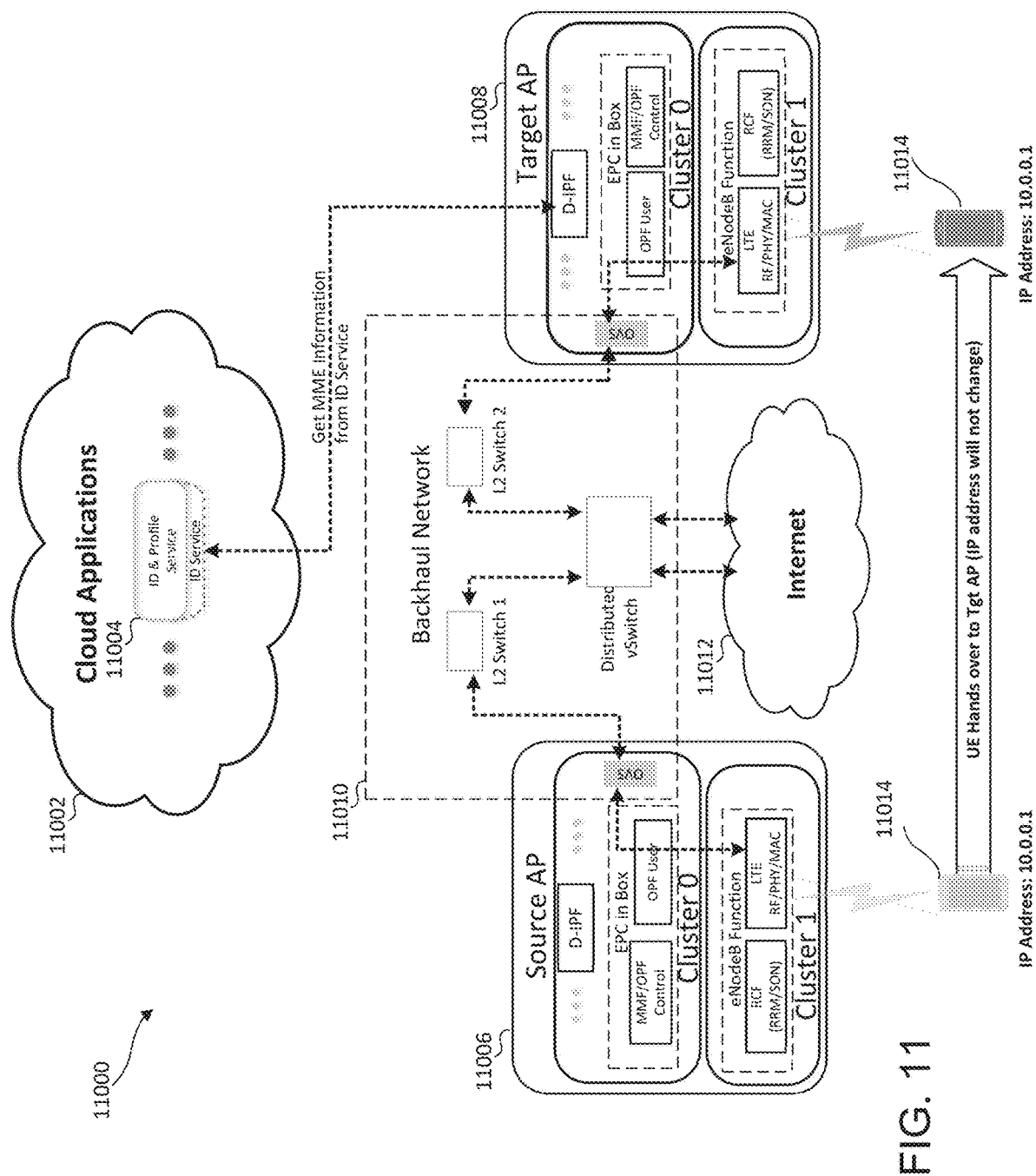
FIG. 11 illustrates an example cloud-based wireless access infrastructure that implements mobility in accordance with the disclosed embodiments.

FIG. 11 illustrates an example cloud-based wireless access system 11000 that implements mobility across APs (e.g., handing over a UE 11014 from a source AP 11006 to a target AP 11008) based on X2 handover (also referred to as HO herein). X2 is a 3GPP defined eNodeB to eNodeB communication protocol providing an interface between eNodeBs. Various elements of system 11000 are described below with reference to FIGS. 12A and 12B which provide an implementation of handover that is supported in system 11000 in one embodiment, where the handover involves a UE connecting to a different AP where the corresponding changes in the AP eNodeB function, MMF, and OPF are achieved reliably and simultaneously. Each one of the source AP 11006 and the target AP 11008 includes a cluster "0" and a cluster "1". Cluster "0" and cluster "1" pertain to the processing cores in the AP hardware where the corresponding applications are run.

Each cluster "0" in each AP includes a Distributed Identity and Profile Function (D-IPF) that handles the communication between the AP and the ID and Profile Service 11004 (same as 8006 in FIGS. 8-10) in the cloud 11002. For example, the D-IPF communicates with the service 11004 to get MME information. Each cluster "0" in each AP further includes an OVS, and "EPC in Box" (which in turn includes an MMF/OPF control and an OPF user plane as described herein with reference to FIGS. 5A and 5B). Each cluster "1" at each AP includes an eNodeB Function which in turn includes an RCF (Radio Control Function, RRM/SON) function and an LTE RF/PHY/MAC function.

The OVS in the source AP 11006 allows for the LTE RF/PHY/MAC function of the source AP 11006 to communicate with the Internet 11012. Specifically, the OVS communicates with a first L2 Switch in a backhaul network 11010, where the first L2 switch communicates with a distributed switch in the backhaul network 11010, and where the distributed switch communicates with the Internet 11012. Similarly, the OVS in the target AP 11008 allows for the LTE RF/PHY/MAC function of the target AP 11008 to communicate with the Internet 11012, through a second L2 Switch and the distributed switch in the backhaul network 11010.

Figure 12A:
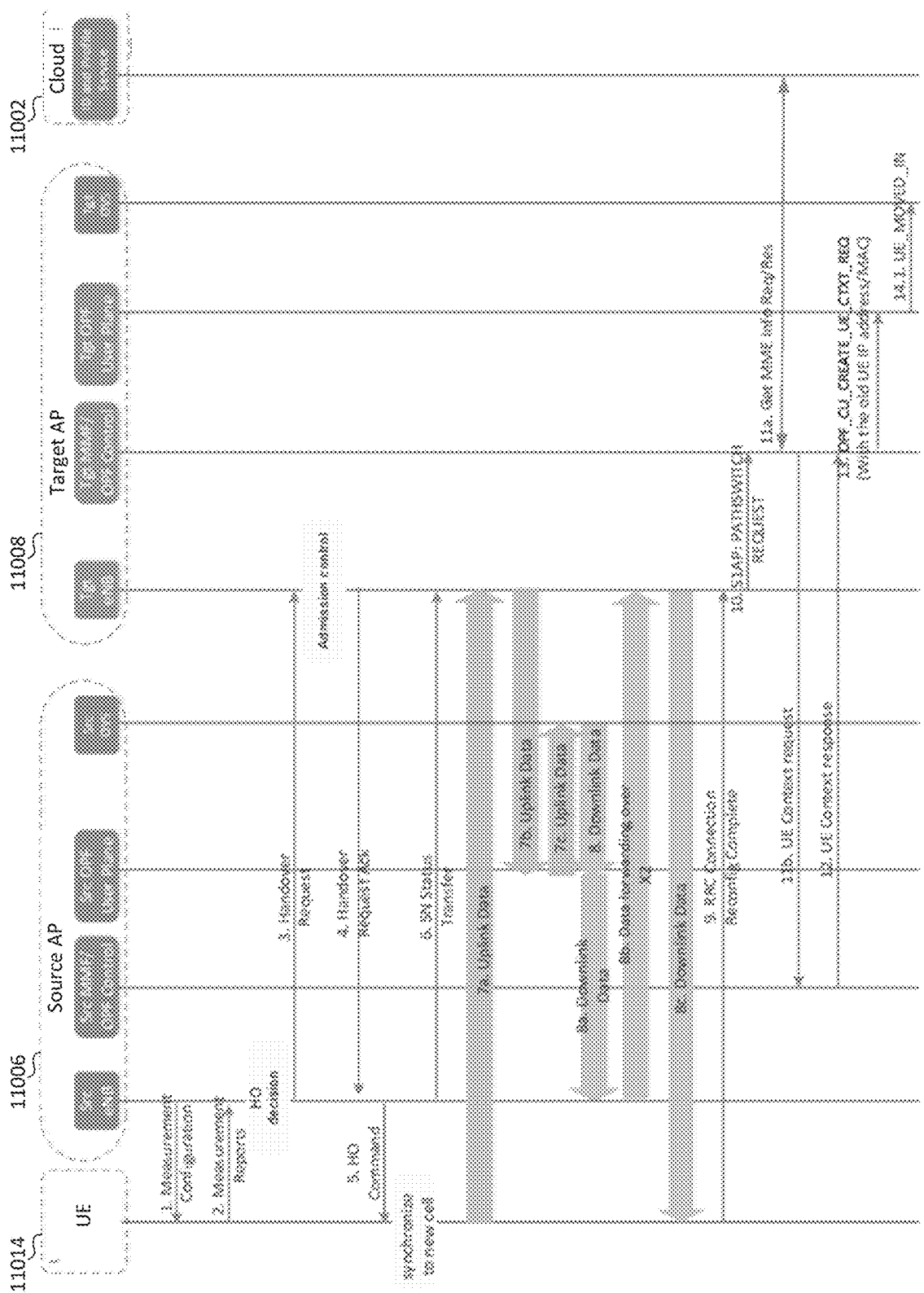
FIGS. 12A and 12B illustrate an example Mobility Message Sequence in accordance with the disclosed embodiments.
Figure 12B:
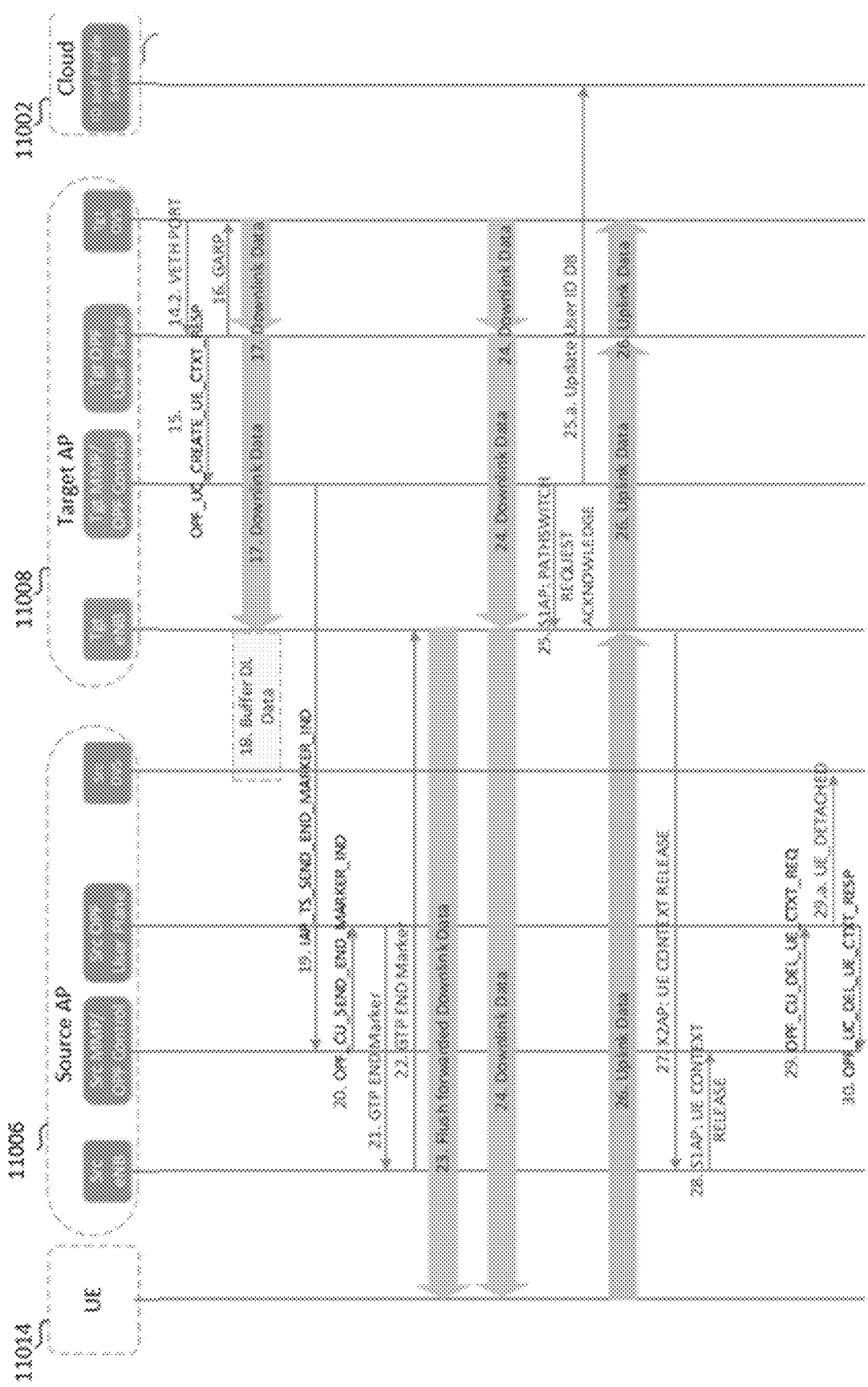

FIGS. 12A and 12B illustrate an example Mobility Message Sequence based on X2 handover according to an embodiment. At (1) a Source eNodeB function at the source AP 11006 performs measurement configurations on the UE 11014 so that the UE 11014 sends measurement reports to assist the source eNodeB to make handover decisions. At (2) the UE 11014 reports better signal strength to source eNodeB through RRC measurement report. The Source eNodeB function decides to perform X2 based handover to the target eNodeB function in the target AP 11008. At (3) the source eNodeB function sends an X2 HO REQUEST message to the Target eNodeB function with Security and RAB (Radio Access Bearer) information of the UE 11014. At (4) the Target eNodeB function performs admission control to check if handover can be accepted, and if admission control is successful, the target eNodeB function sends an X2 HO REQUEST ACKNOWLEDGE with the list of accepted RAB's to the source eNodeB function as a handover Command. At (5) the Source eNodeB function on receiving the X2 HO REQUEST ACKNOWLEDGE prepares the RRC Reconfiguration message to trigger the Handover and sends a handover command to the UE 11014 so that the UE synchronizes with the new cell (i.e., the target AP 11008).

At (6) the Source eNodeB function sends an SN (Sequence Number) STATUS TRANSFER message with Uplink and downlink data information to the target eNodeB function. For the uplink, at (7a) the UE 11014 sends uplink data to the target eNodeB function. At (7b) the target eNodeB function sends uplink data to the source OPF at the source AP 11006. At (7b) the Source OPF forwards uplink packets to a source OVS at the source AP 11006. For the downlink, at (8) the source OVS sends downlink data to the source OPF. At (8a) the source OPF sends the downlink data to the source eNodeB function. At (8b) the Source eNodeB function forwards the downlink data on X2 interface to the target eNodeB function. At (8c) the Target eNodeB function sends downlink data to the UE 11014. Then, at (9) the UE 11014 establishes radio connection with the target eNodeB function and sends RRC Reconfiguration complete to the target eNodeB function.

At (10) the Target eNodeB function sends an S1 Path Switch Request to a target MMF at the target AP 11008. S1 is an interface specified by 3GPP between eNodeBs and EPC. At (11a) Source MMF identification is performed where the Target MMF identifies the source MMF based on Globally Unique MME Identity (GUMMEI) to AP mapping. Specifically, the Target eNodeB uses the "source MME GUMMEI" in the S1 path switch request. The Target MMF needs to resolve the source AP MMF IP address from the GUMMEI to access it to perform UE context transfer. In order to do that, the Target AP MMF looks up the source MMF IP in the cloud ID and profile database service 11002, using the source GUMMEI as the key. The Cloud ID and profile database service 11002 in the embodiments supports this functionality. If the User ID and profile service 11002 fails to respond or sends a failure, target MME terminates handover by sending Path Switch Request Failure to the target eNodeB function.

Upon resolving the source AP MMF IP address, at (11b) the Target MMF sends a UE Context Request to the source MMF along with the source MMF allocated MME-UE-S1APID. At (12) the Source MMF fetches UE context based on MME-UE-S1AP ID and sends it to the target MMF along with UE IP and MAC address. At (13) the Target MMF sends OPF_CU_CREATE_UE_CTXT_REQ along with the UE IP and MAC and all the existing bearers' information to the target OPF. At (14) the Target OPF configures UE context with the target OVS. At (14.1) the target OPF sends UE_MOVED_IN message to a target OVS-AP at the target AP 11008 which creates VETH pair and configures the target OVS (for example, as described herein with reference to the OVS-AP 8010 in FIGS. 8-10). If the target OVS-AP returns failure response, the target OPF sends failure to the target MMF and the target MMF aborts the procedure by sending failure in SLAP Path Switch failure. At (14.2) the target OVS-AP returns VETH port to the target OPF in VETH_PORT. The target OPF opens an L2 raw socket and binds it to VETH port. At (15) the Target OPF sends OPF_UC_CREATE_UE_CTXT_RESP to the target MMF. At (16) the Target OPF sends GARP to the target OVS/backhaul. At (17) downlink data starts flowing from SGi to the target OPF to the target eNodeB function. In a 3GPP network, the SGi interface is the one from the PGW to the Internet—so in these diagrams, the OVS effectively represents the SGi as far as the OPF functionality is concerned (since the OPF is effectively the PGW inside the AP). As such, step (17) is illustrated between the OVS and the target OPF.

At (18) the Target eNodeB function starts buffering the downlink data from the target OPF. At (19) the Target MMF sends the IAP_TS_SEND_END_MARKER_IND to the source MMF. At (20) the Source MMF forwards OPF_CU_SEND_END_MARKER_IND to the source OPF. At (21) the Source OPF sends GTP END marker packet to the source eNodeB. At (22) the Source eNodeB function sends GTP END marker packet to the target eNodeB function. At (23) the Target eNodeB function transmits all the downlink data received via X2 forward tunnel to the UE 11014. At (24) downlink data starts flowing from SGi to the target OPF to the target eNodeB function to the UE 11014 and the buffering at (18) stops. At (25) the Target MMF sends S1AP (S1 access protocol) Path Switch Context Ack to the target eNodeB function. At (25a) the Target MMF updates the User ID and profile database 11002 with new serving AP ID and IP. At (26) uplink data starts flowing from the UE 11014 to the target eNodeB function to the target OPF to the SGi.

At this point a new path has been established. In order to tear down an old path, at (27) the Target eNodeB function sends X2AP (X2 Access Protocol) UE Context Release to the source eNodeB function. At (28) the Source eNodeB function sends S1AP UE Context Release to the source MMF. At (29) the Source MMF sends OPF_CU_DEL_U-E_CTXT_REQ to the source OPF. At (29a) the Source OPF closes the L2 raw socket, clears its context, and sends UE_DETACHED to the source OVS-AP. At (30) the Source OPF clears the UE context and sends OPF_UC_DEL_U-E_CTXT_RESP to the source MMF. The source MMF also clears the UE context.

X2 Handover Configuration Options

Various embodiments allow a new AP point (a node that is being brought up) to detect and establish new X2 association with its immediate neighbors (which are already broadcasting). The X2 interface is as used above to orchestrate the handover. One embodiment uses a Cloud service to perform the discovery and connection establishment. An alternative embodiment uses DNS (Domain Name System) to perform the discovery and connection establishment. A further embodiment uses static configurations on the APs to perform the discovery and connection establishment. These embodiments are described in further detail below.

CLOUD Based Option

Figure 13:
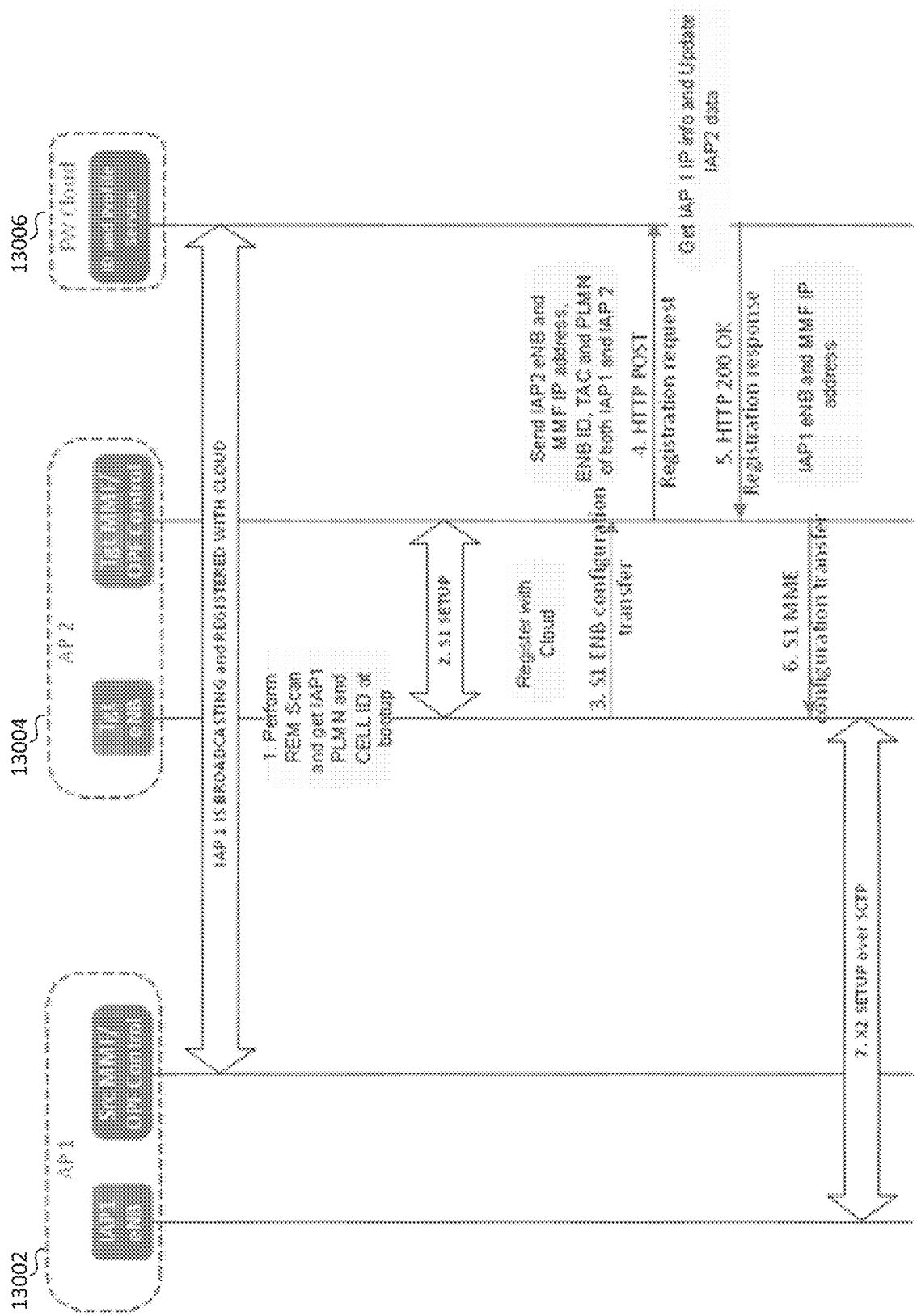
FIGS. 13 and 14 illustrate example message sequences for Discovery and Connection Establishment in accordance with the disclosed embodiments.

FIG. 13 illustrates an example message sequence for cloud based Discovery and Connection Establishment according to an embodiment. In FIG. 13, AP1 13002 is a node that is broadcasting and registered with the cloud 13006, and AP1 13004 is a node that is being brought up. At (1) an eNodeB function at AP2 13004 does a REM (Radio Environment Mapping) scan on boot and is able to successfully decode the CELL ID, EARFCN (E-UTRA Absolute Radio Frequency Channel Number), and PLMN (public land mobile network) from the MIB (Master Information Block), and SIB (System Information Block) broadcast of AP1 13002. The decoded information is updated in internal data structures of AP2 13004.

At (2) the eNodeB function at AP2 13004 performs the S1 Setup with the MMF at AP2 13004 and builds S1 "eNodeB configuration transfer message" to get IP address information of the detected neighbor AP1 13002. The message includes the ENB ID, PLMN, and TAC of AP1 and AP2 and also AP2 eNodeB and MMF IP address. At (3) the AP2 eNodeB sends the S1 "eNodeB configuration transfer message" to the AP2 MMF. At (4) the AP2 MMF on receiving the message builds an HTTP POST using JSON container having below information and does an HTTP POST to CLOUD "ID and Profile Service" 13006 as a registration request:
  AP2 MMF IP address
  AP2 eNodeB IP address
  AP1 home ENB ID, TAC, PLMN
  AP2 home ENB ID, TAC, PLMN The CLOUD "ID and Profile Service" 13006 does a look up of "AP1 home ENB ID, TAC and PLMN" and also updates AP2 information in the database. At (5) the Cloud ID and Profile services 13006 sends AP1 eNodeB IP address and MMF IP address over HTTP 200 OK message to AP2 MMF as a registration response. At this point the AP2 MMF knows the IP Address of AP1 MMF and AP1 eNodeB. At (6) the AP2 MMF stores the IP address of AP1 MMF in its data structures and constructs S1 "MME Configuration transfer" message to be sent to AP2 eNodeB function containing AP1 eNodeB IP address. At (7) AP2 eNodeB function on receiving "MME Configuration transfer" decodes the message and gets AP1 eNodeB IP address and initiates an SCTP association and X2 Setup with AP1 eNodeB function. If the above steps are successful, AP1 13002 and AP2 13004 are known to each other.

DNS-Based Option

Figure 14:
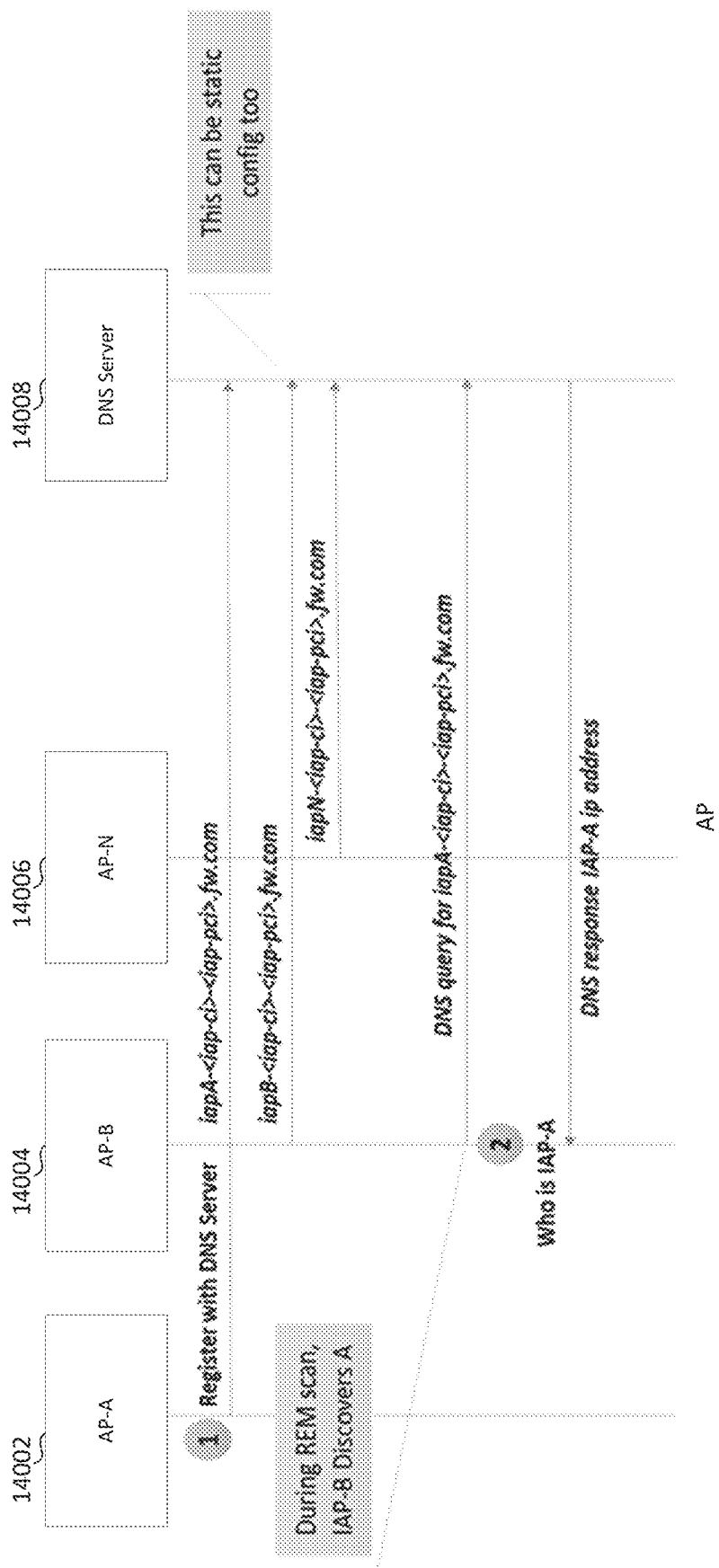

FIG. 14 illustrates an example message sequence for DNS-based Discovery and Connection Establishment according to an embodiment. The DNS-based X2 neighbor discovery may be used by an AP to find the IP addresses of neighboring APs, assuming that each IAP has access to a central DNS server that maintains the mapping between FQDN (Fully Qualified Domain Name) and IP addresses of the APs, and that PCIs and Cell Identity of the neighbors are already discovered using REM before an AP tries to obtain the IP address of a neighboring AP.

FIG. 14 illustrates neighboring APs including AP-A 14002, AP-B 14004, ... AP-N 14006 that have access to a DNS server 14008. The DNS-based neighbor discovery includes the following steps. At (1) DNS Entry Creation is performed for each one of AP-A 14002, AP-B 14004, ... AP-N 14006. Specifically, when a new AP is added to the network, the network manager assigns a FQDN to the AP using the AP CI and PCI as, for example, "<IAP-FQDN>=iap-<iap-ci>-<iap-pci>.fw.com" and creates a DNS entry as, for example, "<IAP-FQDN>: <IAP-IP>", in the DNS table of the DNS server 14008. In some embodiments, this step may be automated using DNS register mechanism on the AP and can be integrated with the startup script of the APs. Then, at (2) X2 Neighbor Discovery is performed. For example, when AP-B 14004 discovers AP-A 14002 using REM, AP-B 14004 constructs a FQDN for AP-A 14002 (for example, "iap-<IAP-B-ci>-<IAP-B-pci>.fw.com") using the CI (Cell Identity) and PCI (Physical Cell Identity) of IAP-B 14004 as in step (1) above and sends a DNS query to the DNS server 14008 to get the IP address of the neighbor AP-A 14002, and the DNS server 14008 returns the IP address of the neighbor AP-A 14002 to AP-B 14004.

AP Static Configuration Option

An alternative embodiment performs Discovery and Connection Establishment Based on Static Configuration in AP. In this embodiment, an AP that is being brought up is configured with eNodeB and MMF IP address of an already broadcasting AP. In one embodiment, for example, in the eNodeB configuration file "wr_cfg.txt" present on the AP that is being brought up, the below configuration parameters are updated with already broadcasting AP data:
  WR_TAG_NO_OF_NGH_CFG=1 (Number of neighbors)
  WR_TAG_NGH_CELL_CFG={{1172.27.2.147,95,1,95, 50502,39150,39150,0,1,0,2,2,7,0,0,60,40}}

In one embodiment, for example, in the MMF configuration file "vbsm_cfg.txt" present on the AP that is being brought up, the below configuration parameters are updated with the already broadcasting AP data:
VB_SM_TARGET_EIBC_PLMN_ID 31310f
VBSM_TARGET_EIBC_IP_ADDR "172.27.2.148"

Idle Mode Mobility

Embodiments provide Idle Mode Mobility for APs such as AP 2110 in the exemplary cloud-based wireless access infrastructure 2000. Embodiments provide two deployment options: Multiple TAC (Tracking Area Code) Configuration, and Single TAC Configuration. In Multiple TAC Configuration, each AP has a Tracking Area ID. When a UE is in Idle Mode and moves from one AP to another AP, it sends TAU to the new AP. In Single TAC Configuration, all the APs in the deployment have the same Tracking Area ID. When a UE is in Idle Mode and moves from one AP to another AP, it does not notify the source or the target AP. Further details of each embodiment are provided below.

Multiple TAC Configuration

In one embodiment, in order to provide idle mode mobility using multiple TAC configuration, the MMF, OPF, and OVS of APs interact to update the tracking area for a UE as it moves from one AP to another AP. In this embodiment, the Cloud ID service is used to resolve key parameters associated with the UE such as the source MMF IP Address.

Figure 15:
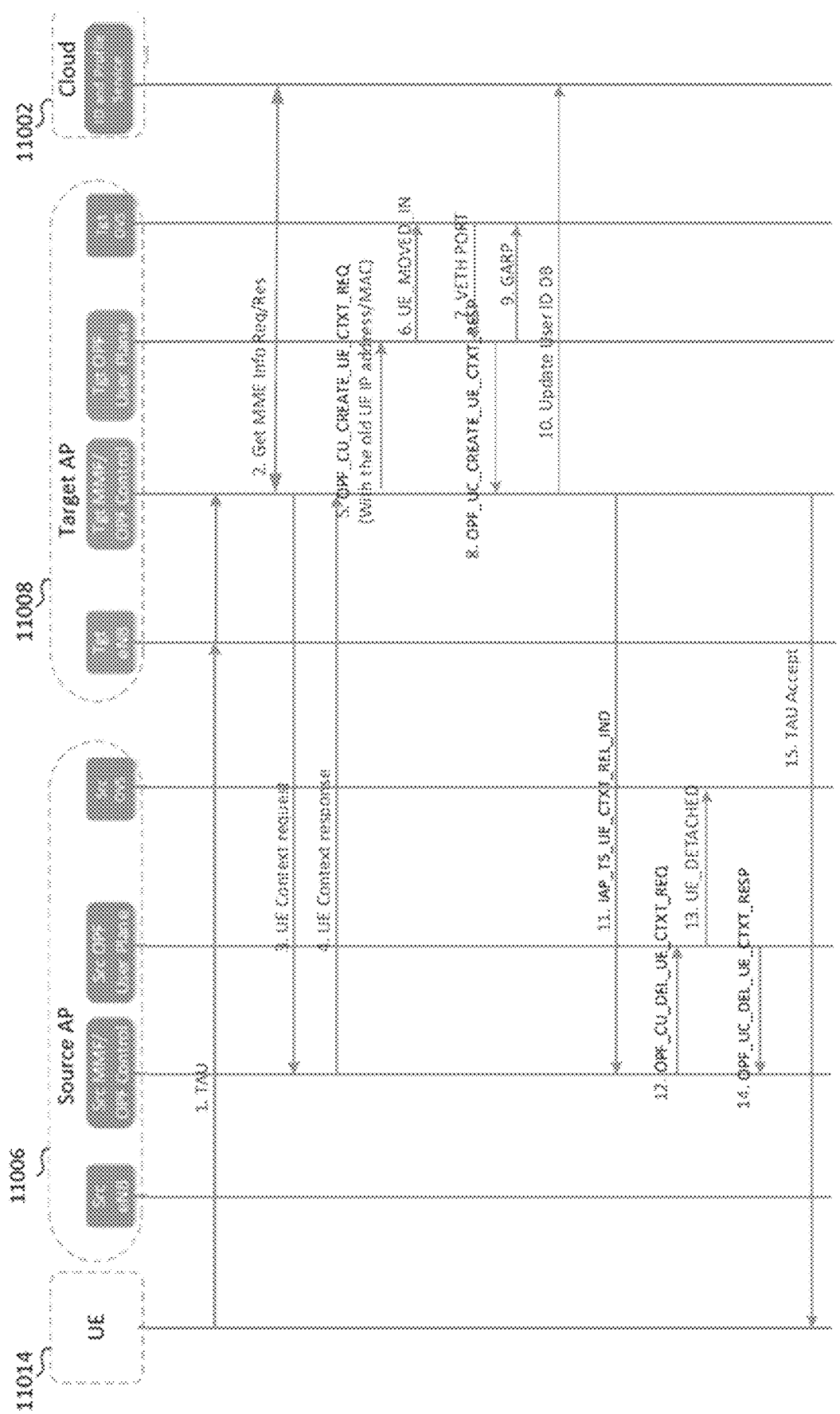
FIGS. 15 and 16 are example message sequences for idle mode mobility in accordance with the disclosed embodiments.

FIG. 15 is an example message sequence for idle mode mobility using multiple TAC configuration in one embodiment. At (1) UE 11004 that is connected to source AP 11006 moves to the coverage area of a new target AP 11008 and detects a new tracking area ID, and sends TAU to the target MMF of the target AP 11008. At (2) the Target MMF gets the source MME GUMMEI in TAU and needs to resolve the source AP MMF IP address from GUMMEI to access it to perform context transfer. In order to do that, the Target AP MMF looks up the source MMF IP in the cloud ID and profile database service 11002, using source GUMMEI as the key. The User ID service 11002 returns the MME IP in Get MME info response to the target MME. If the User ID and Profile service 11002 fails to respond or sends a failure response, Target MMF aborts the procedure by sending a TAU reject.

Upon resolving the source AP MMF IP address, at (3) the Target MMF sends UE Context Request to source MMF at source AP 11006 along with old GUTI (Globally Unique Temporary Identifier) received in TAU. At (4) Source MMF fetches UE context based on old GUTI and sends it to target MMF along with UE IP and MAC address as UE context response. At (5) Target MMF sends Create UE context Request along with UE IP and MAC and all the existing bearers' information to the target OPF at target AP 11008. At (6) target OPF sends UE-Moved-In message to a target OVS-AP at target AP 11008, which in turn creates VETH pair and configures the target OVS at the target AP 11008. If the target OVS-AP returns failure response, target OPF sends failure to target MMF and target MMF aborts the procedure by sending a TAU reject.

At (7) target OVS-AP returns VETH port to target OPF, and Target OPF opens a L2 raw socket and binds it to VETH port. At (8) target OPF sends Create UE response to target MMF. At (9) target OPF sends GARP to target OVS to indicate to network that the UE IP has been moved to new AP. At (10) Target MMF updates User ID and profile database 11002 with new serving AP ID and IP. At (11) Target MMF sends IAP_TS_UE_CTXT_REL_IND to source MMF. At (12) Source MMF sends OPF_CU_DEL_UE_CTXT_REQ to source OPF. At (13) Source OPF closes the L2 raw socket, clears its context, and sends Delete UE to the source OVS-AP at source AP 11006. At (14) Source OPF sends OPF_UC_DEL_UE_CTXT_RESP to source MMF, and Source MMF cleans its own context on receiving this message. At (15) Target MMF sends TAU accept to UE 11004.

Accordingly, this embodiment provides Specification driven deployment, where the trigger for UE context transfer is UE mobility (TAU procedure), and where UE Context transfer is point to point. Further, Paging is done on only the AP where the UE is latched to, thus resulting in low Paging overhead. Yet further, from an implementation perspective, this embodiment results in reduced messaging overhead and can reuse X2 handover architecture.

Single TAC Configuration

In some embodiments, when all APs belong to the same tracking area (i.e., have the same TAC), the UE does not recognize that it has moved from one AP to another AP based on a change in TAC, and therefore does not do a Standards-defined Tracking Area Update procedure. Consequently, in Idle mode (i.e., when the UE is not in any active connection), if the network needs to reach the UE, it does not know which AP's coverage area the UE is in, as the UE may have moved around. As a result, a page to a UE may fail if the original AP that the UE was last attached to does no longer have the UE in its coverage area.

However, one embodiment implements a centralized Idle Mode Mobility Manager (IMM) that tracks the UE, e.g., decides which APs need to page the UE when all APs belong to the same Tracking Area. In one embodiment, for example, the IMM may be implemented in the Cloud as a service. In another embodiment, the IMM may be implemented in a server in the enterprise network or a data-center.

Figure 16:
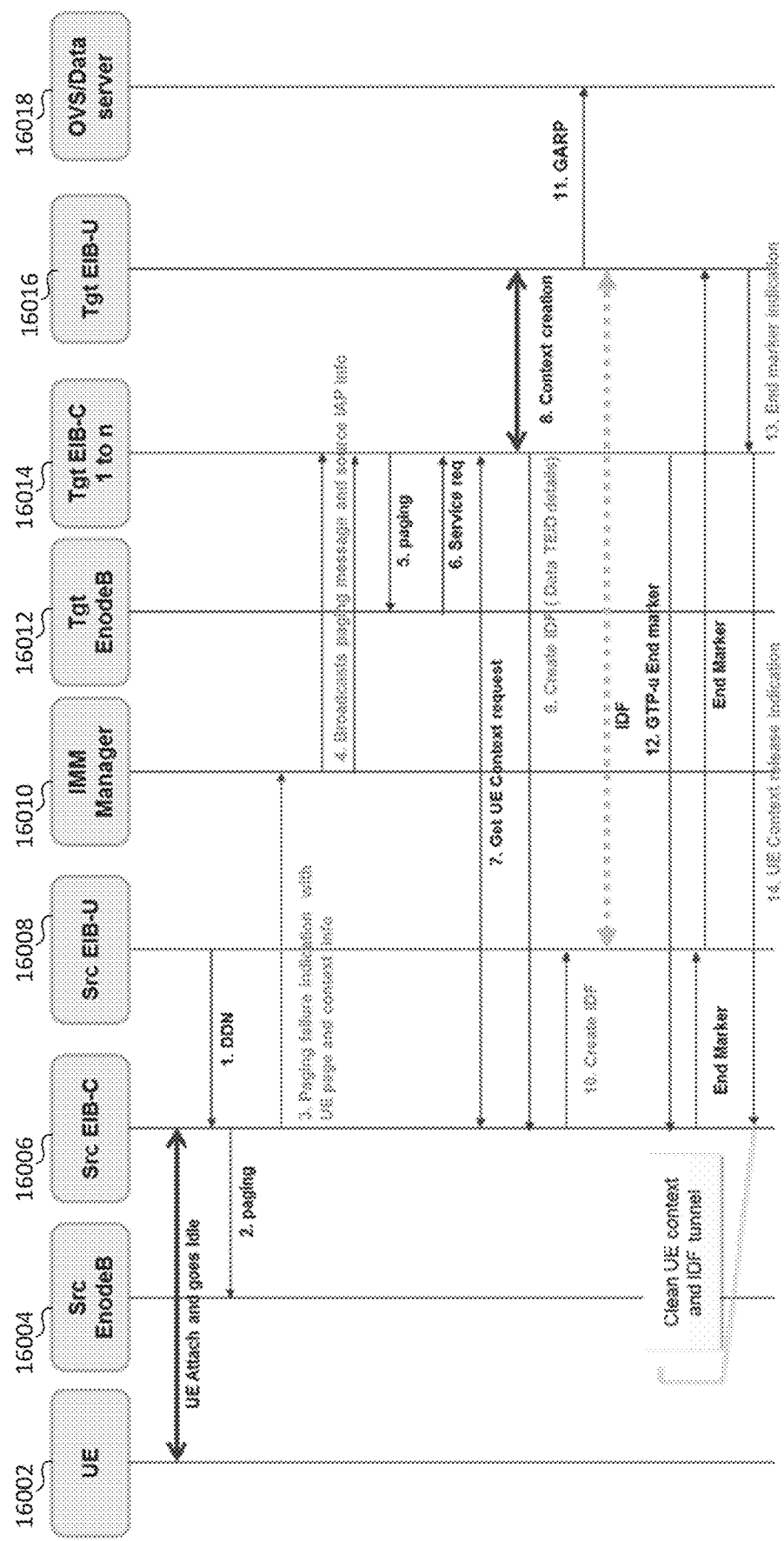

FIG. 16 is an example message sequence for idle mode mobility using multiple TAC configuration in one embodiment. In FIG. 16, EIB refers to "EPC in a Box" (EPC functionality implemented at AP 2110 as described herein, for example, with reference to FIG. 3). The embodiment provides a mechanism outside the Standards whereby the buffered data for the UE is transferred from the source EIB-u (OPF user plane as described, for example, with reference to FIGS. 3, 5A, and 5B herein) to the target EIB-u. In FIG. 16, UE 16002 attaches to source EIB-C at a source AP and goes idle. While UE 16002 is idle, at (1) source EIB-u 16008 at source AP sends a DDN (Downlink Data Notification) to source EIB-c 16006 (EIB-c referring to OPF control plane as described, for example, with reference to FIGS. 3, 5A, and 5B herein), and at (2) source EIB-c 16006 sends paging to source eNodeB function 16004 at the source AP. If the paging fails, at (3) source EIB-c 16006 sends a paging failure indication with UE page and context information to IMM manager 16010, and at (4) IMM manager 16060 broadcasts the paging message and source AP information to target EIB-c 16014 of other APs 1 to n. At (5) one of the target EIBc's corresponding to a target AP sends the paging to a target eNodeB function 16012 of the target AP, and at (6) target eNodeB function in turn sends a service request to the target EIB-c 16014 of the target AP.

At (7) target EIB-c 16014 sends a Get UE Context request to the source EIB-c and obtains the UE context. At (8) target EIB-c 16014 communicates with target EIB-u 16016 to perform context creation. At (9) target EIB-c 16014 indicates to source EIB-c 16006 to create IDF, and source EIB-c 16006 indicates the same to source EIB-u 16008. Then, source EIB-c 16006 and target EIB-c 16014 perform IDF. IDF refers to IP Data Flow and represents the data flow between the source and target EIB-u's.

At (11) target EIB-u 16016 sends GARP to OVS/Data Server 16018. That is, target EIB-u 16016 sends GARP to a data server though a target OVS at the target AP, where the data server is in the enterprise network. At (12) target EIB-c sends a GTP-u (GPRS Tunneling Protocol user-plane) end marker to source EIB-c 16006, where source EIB-c 16006 in turn sends the marker to source EIB-u 16008, and source EIB-u 16008 in turn sends the marker to target EIB-u 16016. AT (13) target EIB-u 16016 sends end marker indication to target EIB-c 16014, and target EIB-c 16014 sends UE context release indication to source EIB-c 16006. Source EIB-c then cleans UE context and IDF tunnel.

Accordingly, in this embodiment, TAU Messaging overhead is low or does not exist. The embodiment achieves Single TAC deployment. The embodiment implements a centralized IMM which may further have intelligence added to optimize paging procedure. The trigger for UE context transfer is Paging failure on Source AP, and the paging is retried on other APs. The Paging message of the UE context transfer is broadcasted to multiple APs. In this embodiment, the Service request/Paging procedure happens on MTMSI (MME assigned Temporary Mobile Subscriber Identity) not GUTI. Since the trigger for mobility is Downlink data notification, some embodiments transfer the data buffered from the source MME to the target. Some embodiments provide an indirect data forwarding mechanism from Source EIB-U to Target EIB-U to handle the buffered packets.

Periodic TAU

Figure 17:
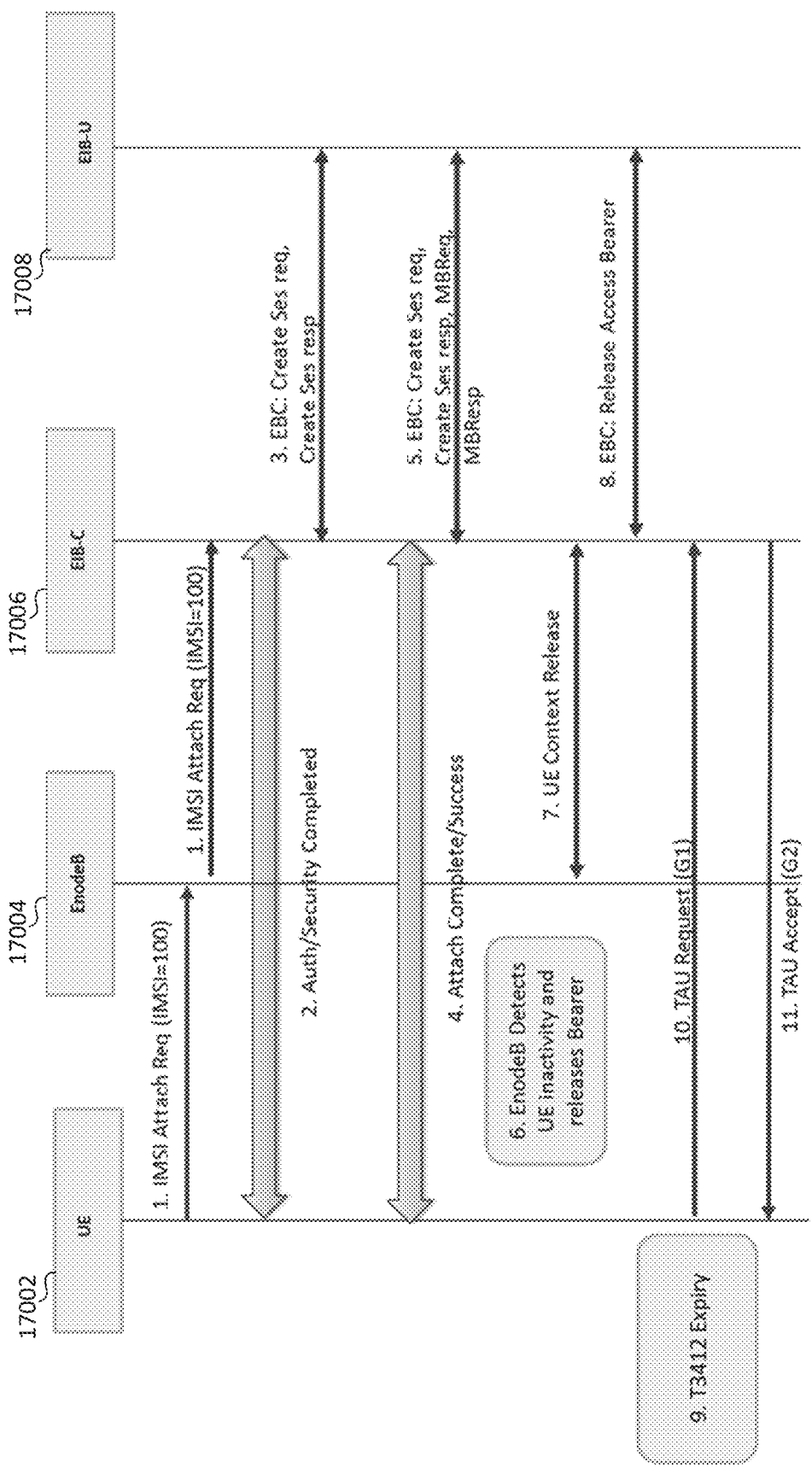
FIG. 17 is an example message sequence for periodic TAU (Tracking Area Update) functionality in accordance with the disclosed embodiments.

One embodiment tracks a UE that is moving around in idle mode by using a periodic Tracking Area Update where the UE periodically informs the network where it is as it moves around. The tracking functionality in this embodiment is performed by the EIB-c and EIB-u. In one embodiment, the UE implements a periodic TAU timer (e.g., T3412). When the UE is in Idle Mode and the periodic TAU timer expires, it sends TAU to the AP. FIG. 17 is an example message sequence for this embodiment. At (1) UE 17002 scans the available network and latches onto it. It sends NAS Attach request message (e.g., IMSI attach Req (IMSI=100)) to eNodeB function 17004 of an AP such as AP 2110 in exemplary cloud-based wireless access infrastructure 2000. The eNodeB function 17004 sends the request to EIB-c 17006 of the AP, which in turn at (2) processes the attach request message and performs Authentication and Security towards UE 17002. Once Security is completed, at (3) EIB-c 17006 initiates session creation towards the user plane EIB-u 17008 of the AP. The EIB-u 17008 establishes bearers or sessions and also allocates IP Address (either using DHCP or file based) and sends a create session response to EIB-c 17006. At (4) EIB-c 17006 allocates GUTI and sends the configured value of T3412 timer at this point and sends Attach Complete towards the UE 17002. At (5) EIB-c 17006 sends Modify bearer request towards EIB-u 17008, which contains the eNodeB allocated TEID (Tunnel End-point Identifier) for data transfer, and receives a corresponding response.

At this point a default bearer and tunnel is established between the UE 17002 and internet (Packet Data Network (PDN)). The UE 17002 may choose to use the default bearer or not. At (6) if the UE 17002 does not choose to send data packets, the eNodeB function 17004 detects the inactivity and releases the E-RAB (E-UTRAN Radio Access Bearers). At (7) as part the E-RAB release, UE Context release message is sent by eNodeB function 17004 toward EIB-c 17006. This message flushes the S1AP IDs used by eNodeB function 17004 and EIB-c 17006 to maintain the S1 connection for this UE 17002. At (8) EIB-c 17006 also sends Release access bearer message towards the EIB-u 17008 which flushes the allocated eNodeB side data TEID for this UE 17002. At (9) at the expiry of T3412 timer, the UE 17002 initiates Periodic TAU procedure. At (10) EIB-c 17006 processes the TAU message received from UE 17002, which comes with the GUTI allocated during attach procedure. If there is any mismatch between the security parameters, EIB-c 17006 triggers Authentication/Security procedure as described in (2) above. At (11) EIB-c 17006 sends TAU Accept message which contains a new GUTI value to UE 17002.

Paging and Service Request

Figure 18:
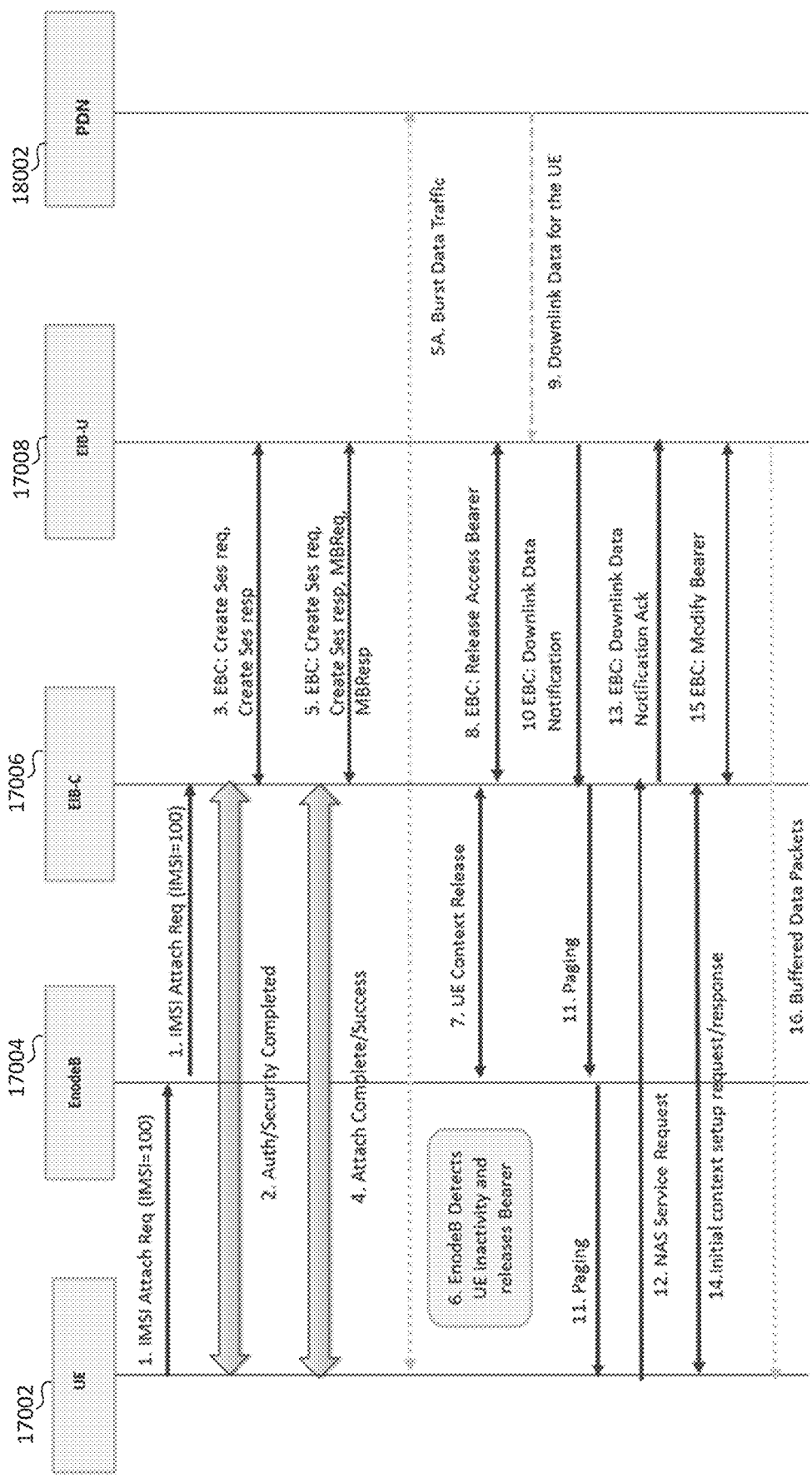
FIG. 18 is an example message sequence for paging and service request during Idle Mode in accordance with the disclosed embodiments.

One embodiment provides functionality for paging a UE that is moving around in idle mode. The functionality is performed by EIB-c and EIB-u described herein. The embodiment addresses paging and Service request TAU scenarios. When a UE is in Idle Mode and the outside network (PDN) wants to initiate data transfer, the EIB-c initiates Paging message towards the UE, the UE responds back with Service request message and moves from ECM_IDLE state to ECM_CONNECTED state. FIG. 18 is an example message sequence for paging and service request during Idle Mode according to an embodiment. Steps (1) to (5) in FIG. 18 are similar to steps (1) to (5) in FIG. 17. However, in FIG. 18, at (5a) the UE 17002 chooses to use the default bearer for a while and burst data traffic flows between PDN 18002 and UE 17002. Steps (6) to (8) in FIG. 18 are again similar to steps (6) to (8) in FIG. 17. Then, at (9) at FIG. 18, the external network PDN 18002 sends some data towards the UE 17002.

At (10) since the EIB-u 17008 no longer has the eNodeB Data TEID with it, it initiates a Downlink Data notification procedure towards EIB-c 17006, indicating that the UE 17002 has some data packets. The Downlink data keeps getting buffered at the EIB-u 17008 for the moment. At (11), once the EIB-c 17008 receives the Downlink Data notification, it initiates a S1AP Paging procedure towards eNodeB function 17004, which in turns pages the UE 17002 over the air. At (12) the UE 17002 in idle mode keeps listing to the paging/broadcast channel, and when it sees there is a paging message from the network, at (12) it responds back to EIB-c 17008 with a NAS Service request procedure. At (13) the EIB-c 17006 processes the Service request message. If there is any mismatch between the security parameters, EIB-c 17006 triggers Authentication/Security procedure as described in step (2). At this point, the EIB-c also notifies positively to EIB-u 17008 with Downlink data notification Acknowledgment message. At (14) the UE context is created on the eNodeB function 17004 similar to the Attach procedure performed in Steps 1-18 in FIG. 8 (DHCP IP Address Allocation Message Sequence). Step (14) in FIG. 18 is illustrated between UE and EIB-c. However, this is NAS exchange (non-access stratum exchange), and therefore eNodeB (as part of access stratum) is a pass-through.

Also, the GW Data TEID value is sent to the eNodeB function 17004 as part of the messaging. At (15) once UE context response is received, the EIB-c 17006 sends Modify bearer to EIB-u 17008 to have the eNodeB side Data TEID value updated in its context. At (16), after the step above, the data path is set between eNodeB function 17004 and EIB-u 17008, and any downlink or uplink packet can reach the internet. Step (16) in FIG. 18 is illustrated between UE and EIB-u. However, this is NAS exchange (non-access stratum exchange), and therefore eNodeB (as part of access stratum) is a pass-through.

In one embodiment, in case of a Paging timeout at (11) where the UE 17002 does not respond back to Paging message, EIB-c 17006 sends a failure indication towards EIB-u 17008, and EIB-u 17008 drops the incoming packets. In one embodiment, in case of Service Request failure at step (11) where the UE 17002 fails Authentication or security or eNodeB function 17004 does not send respond to initial context setup message or sends a failure, EIB-c 17006 sends a failure indication towards EIB-u 17008, and EIB-u 17008 drops the incoming packets.

As disclosed, embodiments provide mechanisms for UE IP address allocation and for handling idle mode and connected mode mobility in a network comprising of distributed "Network-in-a-Box" LTE nodes such as the AP 2110. Embodiments further address related functionalities such as Tracking Area Updates and Paging for such a "Network-in-a-Box" LTE deployment. Embodiments enable a seamless mobility environment by providing, for example, IP address continuity, signaling between "Network-in-a-Box" nodes to share UE context, effectively tracking and paging a UE, and providing a path to the UE for data after a page as it moves around a "Network-in-a-Box" LTE based deployment.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A method for enabling Layer 2 (L2) mobility between a first access point (AP) and a second AP, comprising:
attaching a user equipment (UE) to the first AP, wherein attaching the UE to the first AP comprises:
requesting a UE Media Access Control (MAC) address from a User ID and Profile Service using an International Mobile Subscriber Identity (IMSI) associated with the UE as a lookup key;
using the UE MAC address returned by the User ID and Profile Service to create a Layer 2 Virtual Ethernet (VETH) pair between an Optimized Packet Function (OPF) and an Open Virtual Switch (OVS), wherein an intermediary OVS function in the first AP facilitates socket binding between a pair of VETH ports, the pair of VETH ports comprising one VETH port at the OPF and another VETH port at the OVS, wherein the OVS function stores and maintains UE information in a database;
sending an Internet Protocol (IP) address request from the OPF to an external Dynamic Host Configuration Protocol (DHCP) server via the OVS, wherein the external DHCP server returns an allocated IP address; and
sending the allocated IP address, the IMSI associated with the UE, and an identification (ID) associated with the first AP to the User ID and Profile Service to be stored as part of the UE information; and
performing an X2-based handover of the UE to the second AP, wherein the second AP associates the UE with the allocated IP address and MAC address stored by the User ID and Profile Service as part of the UE information.

2. The method of claim 1, wherein the first AP and the second AP comprise a set of one or more base-station functions including one or more eNodeB functions and a set of one or more core-network functions including one or more Evolved Packet Core (EPC) functions.

3. The method of claim 1, wherein the User ID and Profile Service stores the IP address in a database table comprising a set of identities (IDs) associated with the UE.

4. The method of claim 2, wherein the IP address allocated to the UE does not change when the UE is handed over to another AP with another set of one or more base-station functions and another set of one or more core-network functions.

5. The method of claim 2, wherein the set of one or more core-network functions include a mobility management function (MMF) and an optimized packet function (OPF), wherein the MMF is configured to perform at least a subset of functions of a mobility management entity (MME), wherein the OPF is configured to perform at least a subset of functions of a Serving Gateway (SG-W) node or a packet-data gateway (PGW) node.

6. The method of claim 5, wherein during the step of attaching the UE to the first AP, the MMF sends a UE information request to the User ID and Profile Service with the IMSI as a parameter and receives the UE MAC address in response, wherein the MMF sends the UE MAC address to the OPF.

7. The method of claim 1, wherein the IP address has a lease time, wherein the OPF starts three timers T1, T2, and T3 for the UE, wherein T3 is a time till lease expiry, T1 is a configurable time such that T1<T3, wherein T1 indicates when a lease renew from a corresponding DHCP server has to be attempted by unicasting, wherein T2 is a configurable time such that T1<T2<T3, wherein T2 indicates when a lease renew from any DHCP server has to be attempted by broadcasting.

8. The method of claim 7, wherein the OPF communicates with the external DHCP server according to the three timers and through the OVS to renew or deallocate the lease that maintains the IP address for the UE.

9. The method of claim 1, wherein DHCP rules are retained at the OVS for subsequent DHCP IP address renewal.

10. A system for enabling Layer 2 (L2) mobility between a first access point (AP) and a second AP, comprising:
attaching a user equipment (UE) to the first AP, wherein attaching the UE to the first AP comprises:
requesting a UE Media Access Control (MAC) address from a User ID and Profile Service using an International Mobile Subscriber Identity (IMSI) associated with the UE as a lookup key;
using the UE MAC address returned by the User ID and Profile Service to create a layer 2 Virtual Ethernet (VETH) pair between an Optimized Packet Function (OPF) and an Open Virtual Switch (OVS), wherein an intermediary OVS function in the first AP facilitates socket binding between a pair of VETH ports, the pair of VETH ports comprising one VETH port at the OPF and another VETH port at the OVS, wherein the OVS function stores and maintains UE information in a database;

sending an Internet Protocol (IP) address request from the OPF to an external Dynamic Host Configuration Protocol (DHCP) server via the OVS, wherein the external DHCP server returns an allocated IP address; and sending the allocated IP address, the IMSI associated with the UE, and an identification (ID) associated with the first AP to the User ID and Profile Service to be stored as part of the UE information; and performing an X2-based handover of the UE to the second AP, wherein the second AP associates the UE with the allocated IP address and MAC address stored by the User ID and Profile Service as part of the UE information.

11. The system of claim 10, wherein the User ID and Profile Service stores the IP address in a database table comprising a set of identities (IDs) associated with the UE, wherein the IP address of the UE does not change during the X2-based handover to the second AP.

12. The system AP of claim 11, wherein the first AP comprises a set of one or more first base-station functions including a first eNodeB function, wherein the second AP further comprises a set of one or more second base-station functions including a second eNodeB function, wherein a first MMF of the first AP and a second MMF of the second AP are configured to perform at least a subset of functions of a mobility management entity (MME), and wherein a first OPF of the first AP and a second OPF of the second AP are configured to perform at least a subset of functions of a Serving Gateway (SG-W) node or a packet-data gateway (PGW) node.

13. The system of claim 12, wherein during the X2-based handover of the UE in a connected mode, the UE sends uplink data to the second eNodeB function, wherein the second eNodeB sends the uplink data to the first OPF, wherein the OVS of the first AP communicates with the Internet through a backhaul network, wherein the X2-based handover includes identification of the first MMF to perform UE context transfer, and wherein the second MMF look up an IP address of the first MMF using a Globally Unique MME Identity (GUMMEI) as a key in the database table of the User ID and Profile Service.

14. The system of claim 12, wherein the X2-based handover of the UE is performed in an idle mode, wherein when the first AP and the second AP have different tracking area IDs, the X2-based handover is based on a Globally Unique MME Identity (GUMMEI) of the first MMF in a Tracking Area Update (TAU) sent by the UE to the second AP, wherein when the first AP and the second AP have a same tracking area ID, the X2-based handover is based on information from a centralized mobility manager that receives paging failures from the first AP.

15. A first access point (AP), comprising:
a memory storing instructions for execution by at least one processor; and
at least one processor configured to execute the instructions to:
  attaching a user equipment (UE) to the first AP, wherein attaching the UE to the first AP comprises:
    requesting a UE Media Access Control (MAC) address from a User ID and Profile Service using an International Mobile Subscriber Identity (IMSI) associated with the UE as a lookup key;
    using the UE MAC address returned by the User ID and Profile Service to create a Layer 2 Virtual Ethernet (VETH) pair between an Optimized Packet Function (OPF) and an Open Virtual Switch (OVS), wherein an intermediary OVS function in the first AP facilitates socket binding between a pair of VETH ports, the pair of VETH ports comprising one VETH port at the OPF and another VETH port at the OVS, wherein the OVS function stores and maintains UE information in a database;
    sending an Internet Protocol (IP) address request from the OPF to an external Dynamic Host Configuration Protocol (DHCP) server via the OVS, wherein the external DHCP server returns an allocated IP address; and
    sending the allocated IP address, the IMSI associated with the UE, and an identification (ID) associated with the first AP to the User ID and Profile Service to be stored as part of the UE information; and
  performing an X2-based handover of the UE to a second AP, wherein the second AP associates the UE with the allocated IP address and MAC address stored by the User ID and Profile Service as part of the UE information.

16. A second access point (AP), comprising:
a memory storing instructions for execution by at least one processor; and
at least one processor configured to execute the instructions to:
  receiving an X2-based handover of a user equipment (UE) from a first AP after an attachment of the UE to the first AP, wherein the attachment of the UE to the first AP comprises:
    requesting, by the first AP, a UE Media Access Control (MAC) address from a User ID and Profile Service using an International Mobile Subscriber Identity (IMSI) associated with the UE as a lookup key;
    using, by the first AP, the UE MAC address returned by the User ID and Profile Service to create a layer 2 Virtual Ethernet (VETH) pair between an Optimized Packet Function (OPF) and an Open Virtual Switch (OVS), wherein an intermediary OVS function in the first AP facilitates socket binding between a pair of VETH ports, the pair of VETH ports comprising one VETH port at the OPF and another VETH port at the OVS, wherein the OVS function stores and maintains UE information in a database;
    sending, by the first AP, an Internet Protocol (IP) address request from the OPF to an external Dynamic Host Configuration Protocol (DHCP) server via the OVS, wherein the external DHCP server returns an allocated IP address; and
    sending, by the first AP, the allocated IP address, the IMSI associated with the UE, and an identification (ID) associated with the first AP to the User ID and Profile Service to be stored as part of the UE information; and
  associating the UE with the allocated IP address and MAC address stored by the User ID and Profile Service as part of the UE information.

* * * * *